United States Patent
Cote et al.

(10) Patent No.: US 9,218,639 B2
(45) Date of Patent: Dec. 22, 2015

(54) PROCESSING ORDER IN BLOCK PROCESSING PIPELINES

(71) Applicant: Apple Inc., Cupertino, CA (US)

(72) Inventors: Guy Cote, San Jose, CA (US); Mark P. Rygh, Union City, CA (US); Timothy John Millet, Mountain View, CA (US); Jim C. Chou, San Jose, CA (US); Joseph J. Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 14/039,820

(22) Filed: Sep. 27, 2013

(65) Prior Publication Data
US 2015/0091914 A1    Apr. 2, 2015

(51) Int. Cl.
| | |
|---|---|
| G06T 15/00 | (2011.01) |
| G06T 1/20 | (2006.01) |
| H04N 19/61 | (2014.01) |
| H04N 19/423 | (2014.01) |
| H04N 19/436 | (2014.01) |

(52) U.S. Cl.
CPC .............. *G06T 1/20* (2013.01); *H04N 19/423* (2014.11); *H04N 19/436* (2014.11); *H04N 19/61* (2014.11)

(58) Field of Classification Search
CPC ........ G06T 9/004; H04N 19/61; H04N 19/90; H04N 19/96; H04N 19/124; H04N 19/00781; H04N 19/00969; H04N 19/00987
USPC ................ 345/419, 424; 375/240.03, 240.12, 375/240.24; 382/232, 234, 251
See application file for complete search history.

(56) References Cited

U.S. PATENT DOCUMENTS

| | | |
|---|---|---|
| 6,005,624 A | 12/1999 | Vainsencher |
| 7,725,745 B2 | 5/2010 | Gabor et al. |
| 7,768,520 B2 | 8/2010 | Deb |
| 7,822,116 B2 | 10/2010 | Hinds |
| 7,929,599 B2 | 4/2011 | Ganesh et al. |
| 8,059,717 B2 * | 11/2011 | Saigo et al. .............. 375/240.12 |
| 8,068,545 B2 | 11/2011 | Penna et al. |

(Continued)

FOREIGN PATENT DOCUMENTS

WO    2013107906    7/2013

OTHER PUBLICATIONS

ITU-T H2.64 "Series H: Audiovisual and Multimedia Systems Infrastructure of Audiovisual Services—Coding of Moving Video—Advanced video coding for generic audiovisual services" Apr. 2013 pp. 1-732.

*Primary Examiner* — Phu K Nguyen
(74) *Attorney, Agent, or Firm* — Robert C. Kowert; Meyertons, Hood, Kivlin, Kowert & Goetzel, P.C.

(57) ABSTRACT

A knight's order processing method for block processing pipelines in which the next block input to the pipeline is taken from the row below and one or more columns to the left in the frame. The knight's order method may provide spacing between adjacent blocks in the pipeline to facilitate feedback of data from a downstream stage to an upstream stage. The rows of blocks in the input frame may be divided into sets of rows that constrain the knight's order method to maintain locality of neighbor block data. Invalid blocks may be input to the pipeline at the left of the first set of rows and at the right of the last set of rows, and the sets of rows may be treated as if they are horizontally arranged rather than vertically arranged, to maintain continuity of the knight's order algorithm.

20 Claims, 18 Drawing Sheets

(56) References Cited

U.S. PATENT DOCUMENTS

| | | |
|---|---|---|
| 8,213,511 B2 | 7/2012 | Swami et al. |
| 8,284,844 B2 | 10/2012 | Macinnis et al. |
| 8,320,448 B2 | 11/2012 | Zhao et al. |
| 8,369,411 B2 * | 2/2013 | Au et al. .................. 375/240.24 |
| 8,379,718 B2 | 2/2013 | Wang et al. |
| 8,488,673 B2 | 7/2013 | Dencher |
| 8,532,383 B1 | 9/2013 | Thakkar et al. |
| 8,594,185 B2 * | 11/2013 | Ohgose et al. ............ 375/240.02 |
| 8,649,620 B2 * | 2/2014 | Shibahara et al. ............. 382/233 |
| 8,660,193 B2 * | 2/2014 | Rubinstein et al. ....... 375/240.26 |
| 8,837,575 B2 * | 9/2014 | Heinrich et al. ............... 375/240 |
| 8,849,052 B2 * | 9/2014 | Sato .............................. 382/251 |
| 2004/0042669 A1 | 3/2004 | Jeon et al. |
| 2005/0169371 A1 | 8/2005 | Lee et al. |
| 2010/0053304 A1 | 3/2010 | Underkoffler et al. |
| 2010/0142623 A1 | 6/2010 | Vaduganathan et al. |
| 2012/0014439 A1 | 1/2012 | Segall et al. |
| 2012/0076207 A1 | 3/2012 | Schmit et al. |
| 2012/0099657 A1 | 4/2012 | Tanaka et al. |
| 2012/0140822 A1 | 6/2012 | Wang et al. |
| 2012/0287995 A1 | 11/2012 | Budagavi |
| 2013/0003837 A1 | 1/2013 | Yu et al. |
| 2013/0182774 A1 | 7/2013 | Wang et al. |
| 2013/0188702 A1 | 7/2013 | Li et al. |

* cited by examiner

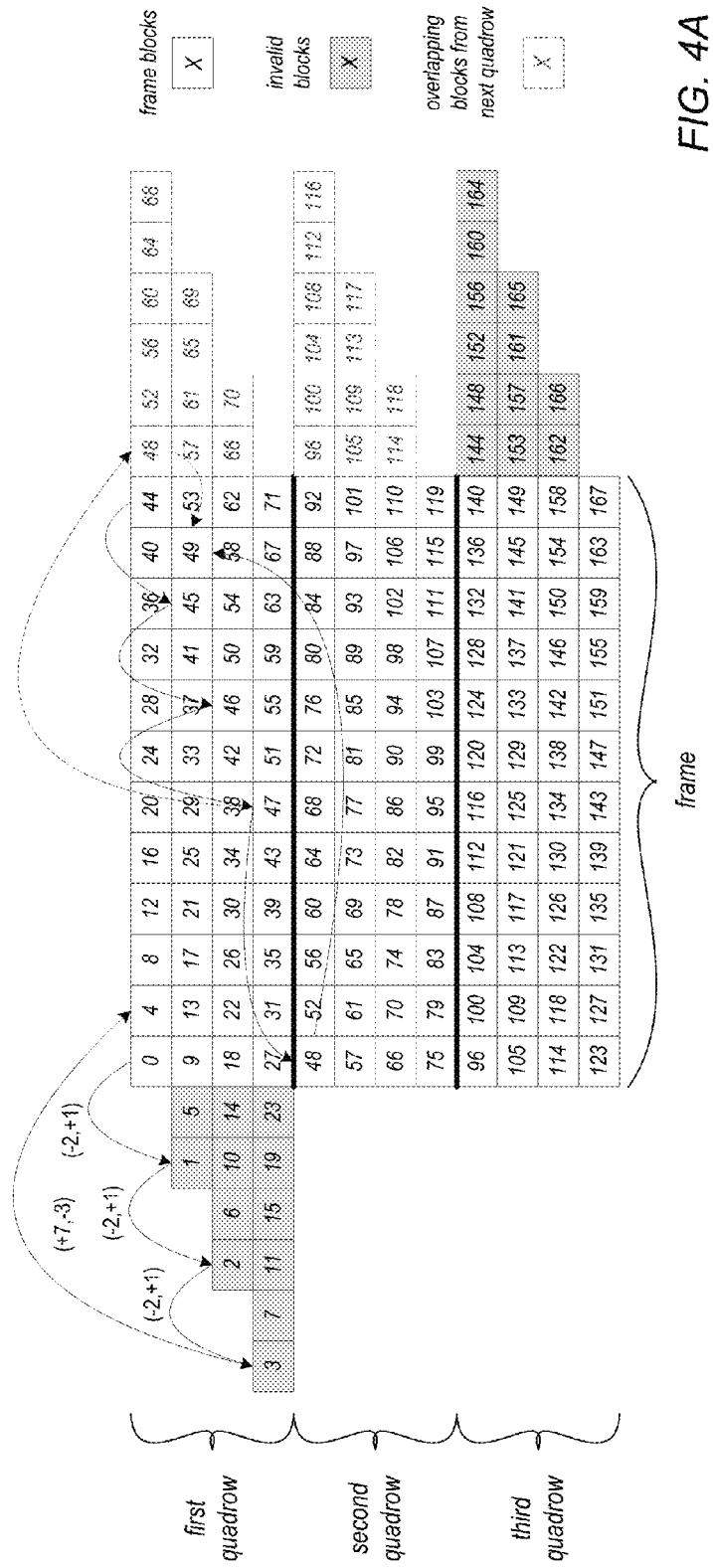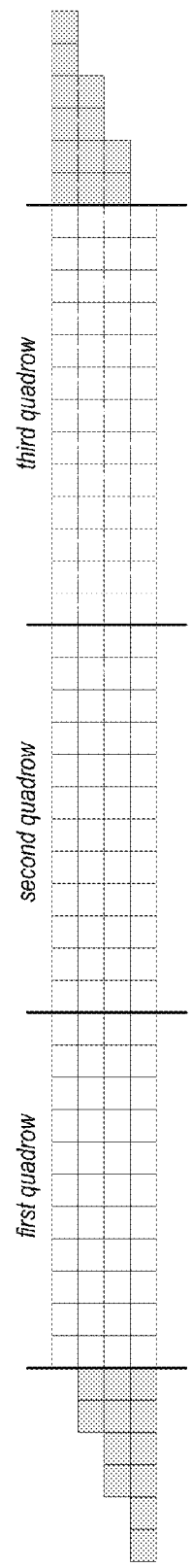
FIG. 4A
FIG. 4B

PROCESSING ORDER IN BLOCK PROCESSING PIPELINES

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing pipeline methods and apparatus are described in which blocks are input to and processed in a pipeline according to an order referred to herein as "knight's order." An input frame is divided into rows and columns of blocks of pixels (e.g., 16×16 pixel blocks). In a basic knight's order algorithm, instead of inputting the blocks to the pipeline in scan order, the next block input to the pipeline is taken from two columns left, one row down (−2,+1) in the frame. Note, however, that other spacings (e.g., three columns left, one row down) may be used in some embodiments. The knight's order processing method may provide spacing (e.g., one or more stages) between adjacent blocks in the pipeline, which, for example, facilitates feedback of data from a downstream stage of the pipeline processing a first block to an upstream stage of the pipeline processing a second block that depends on the data from the first block, thus handling dependencies.

In at least some embodiments, the rows of blocks in the input frame may be divided into groups or sets of two or more rows, referred to herein as quadrows, with the knight's order processing method constrained by the quadrow boundaries. In some embodiments, groups of four rows may be used; however, other numbers of rows may be used to constrain the knight's order processing method. When using four rows as the quadrow constraints, and assuming (−2,+1) spacing for the knight's order, when at the bottom row of a quadrow, the next block input to the pipeline is seven columns right, three rows up (+7,−3). In other words, the method goes back to the top of the quadrow. Constraining the knight's order processing method by quadrows may, for example, facilitate maintaining locality of neighbor block data that may be required when processing the blocks at various stages of the pipeline.

In at least some embodiments, invalid blocks (blocks that are outside the boundary of the frame and that do not contain valid frame data) may be input to the pipeline at the left of the first quadrow and at the right of the last quadrow, and the quadrows may be treated as if they are horizontally arranged rather than vertically arranged thus overlapping quadrows in the pipeline, to maintain continuity of the knight's order algorithm.

BRIEF DESCRIPTION OF THE DRAWINGS

FIGS. 4A and 4B graphically illustrate the knight's order processing method including the algorithm for determining a next block, according to at least some embodiments.

Figure 1:
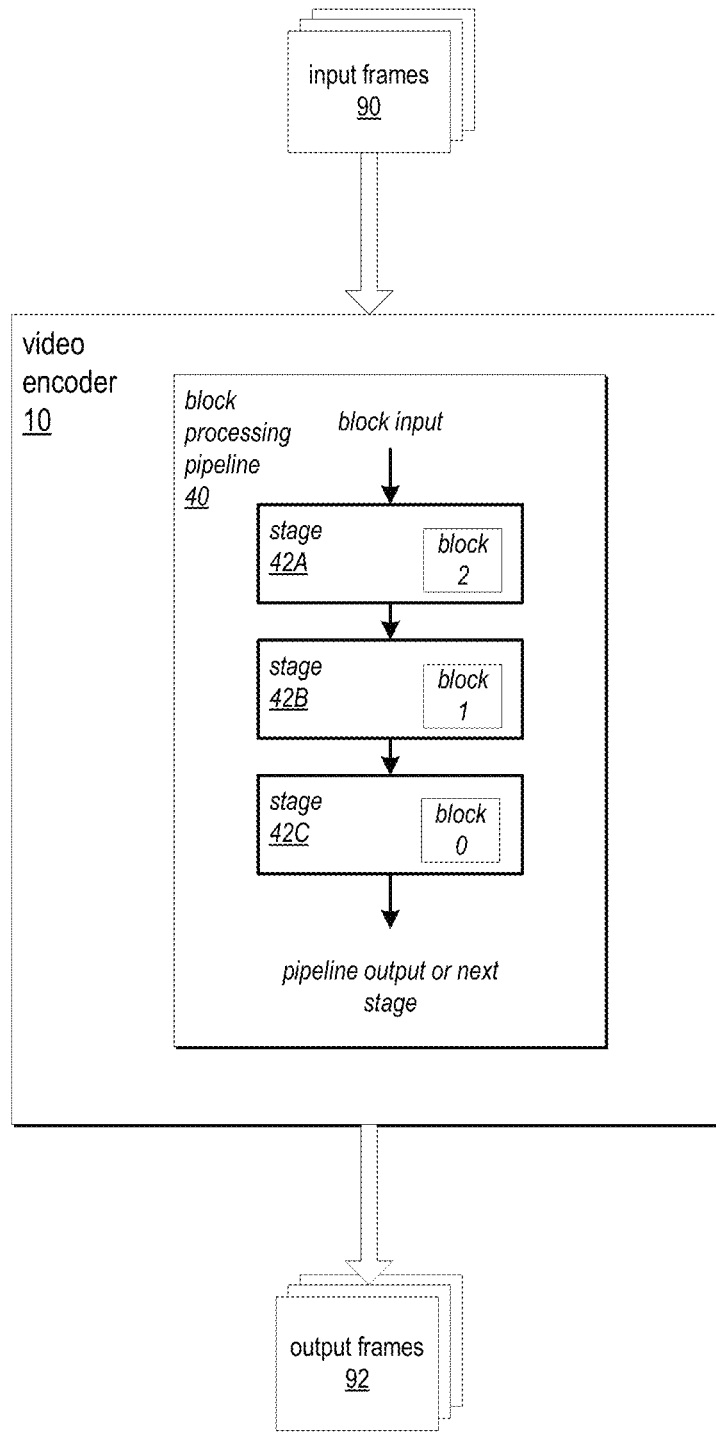
FIG. 1 illustrates an example video encoder including a conventional block processing pipeline that processes blocks from input frames in scan order.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Various embodiments of methods and apparatus for processing digital video frames in block processing pipelines are described. Embodiments of block processing pipeline methods and apparatus are described in which, rather than processing blocks in the pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2. The knight's order processing method may provide spacing (e.g., one or more stages) between adjacent blocks in the pipeline, which, for example, facilitates feedback of data from a downstream stage of the pipeline processing a first block to an upstream stage of the pipeline processing a second block that depends on the data from the first block. In at least some embodiments, the rows of blocks in the input frame may be divided into groups or sets of two or more rows, for example sets of four rows, referred to herein as quadrows, with the knight's order processing method constrained by the quadrow boundaries. Constraining the knight's order processing method by quadrows may, for example, facilitate maintaining locality of neighbor block data that may be required when processing the blocks at various stages of the pipeline.

Figure 14:
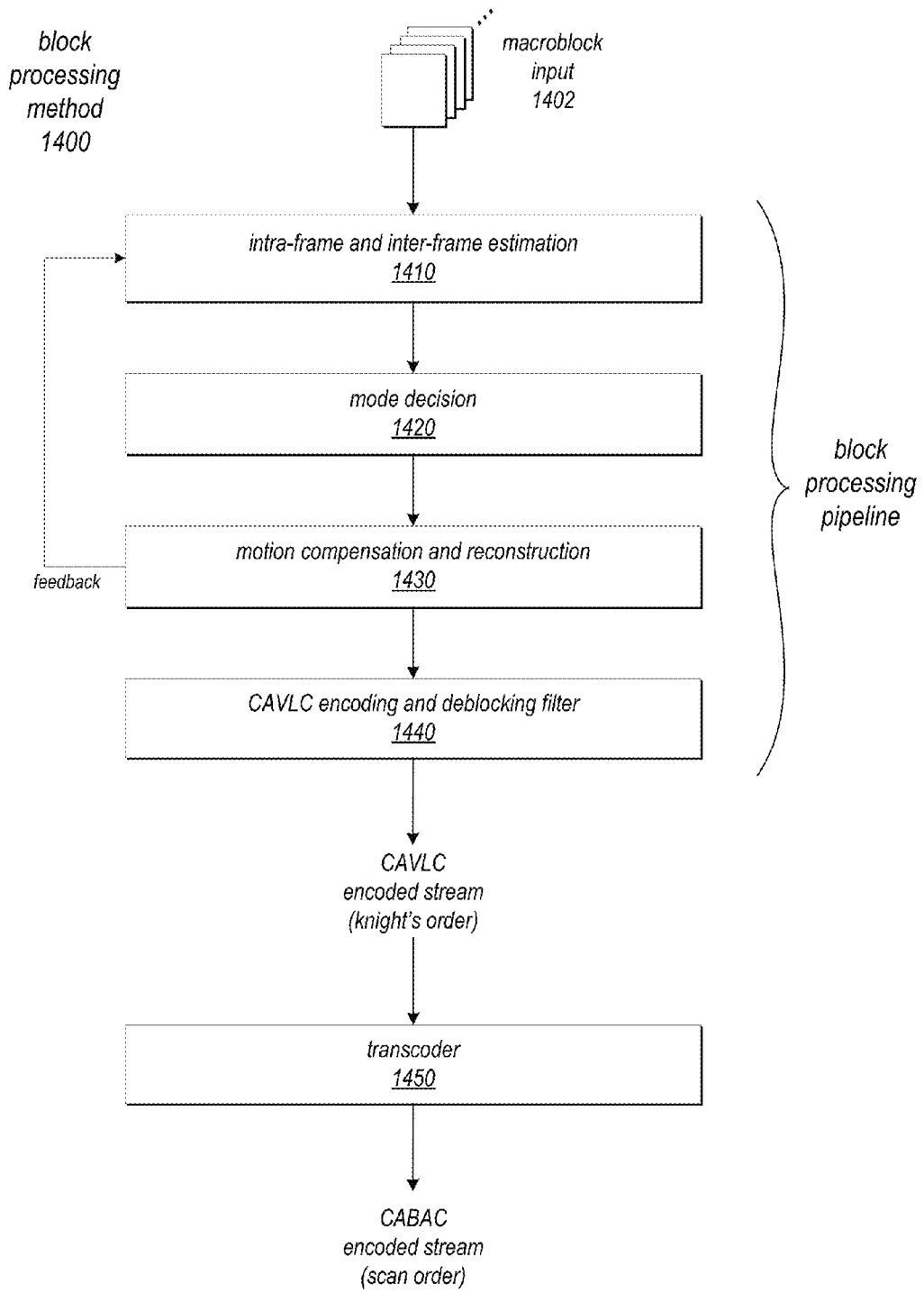
FIG. 14 is a high-level block diagram of general operations in an example block processing method that may be implemented by a block processing pipeline that implements the knight's order processing method, according to at least some embodiments.

Embodiments of the knight's order processing method are generally described herein in the context of video processing in which input video frames are subdivided into and processed according to blocks of elements (e.g., 16×16, 32×32, or 64×64 pixel blocks). Embodiments of an example H.264 video encoder which includes a block processing pipeline that implements and leverages the knight's order processing method are described herein. The H.264 video encoder converts input video frames from an input format into H.264/Advanced Video Coding (AVC) format as described in the H.264/AVC standard (the H.264 Recommendation). FIG. 14 illustrates an example block processing pipeline of an example H.264 video encoder. However, embodiments of the knight's order processing methods may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the knight's order processing methods may include, but are not limited to, H.263, MPEG-2, MPEG-4, and JPEG-2000 video encoders. However, it is to be noted that embodiments of the knight's order processing method may be used in any block processing pipeline, including but not limited to block processing pipelines implemented in various other video encoders and/or decoders (which may be referred to as codecs) in which digital video frames input in one format are encoded or converted into another format. Further note that the knight's order processing method may be used in software and/or hardware implementations of video encoders. In addition to video encoders/decoders, the knight's order processing method may be used in various other software and/or hardware applications in which blocks from a video frame or still digital image are processed, for example in pipelines that process still digital images in various image processing applications. Thus, it is to be understood that the term frame or video frame as used herein may also be taken to refer to any digital image.

Embodiments of the knight's order processing method are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the knight's order processing method may be applied in applications in which digital images (e.g., video frames or still images) are processed by single elements (e.g., single pixels).

Knight's Order Processing

Figure 3:
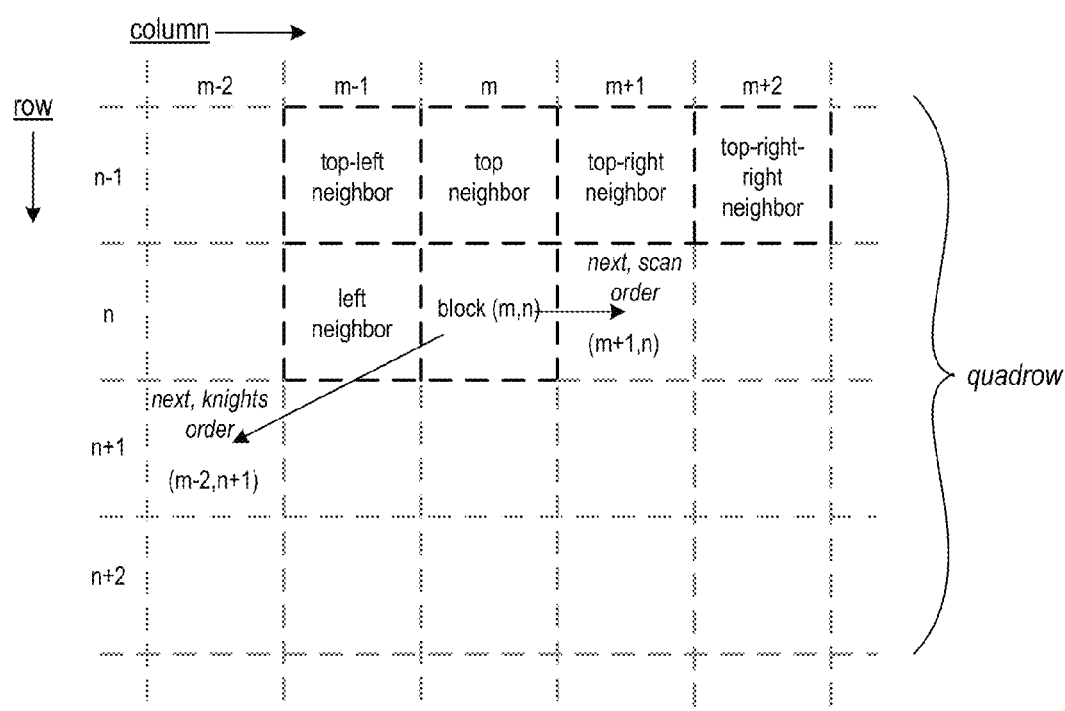
FIG. 3 shows neighbor blocks of a current block in a frame, and further illustrates a knight's order processing method for the blocks, according to at least some embodiments.

One or more operations or modules of a block processing method implemented in a block processing pipeline may require information from one or more other neighbor blocks when processing a given block. FIG. 3 shows neighbors of a current block (m,n) from which information may be required—left (m−1,n); top (m,n−1); top-left (m−1,n−1); top-right (m+1,n−1); and top-right-right (m+2,n−1). For example, in the H.264 coding standard, neighbor information may be used in various modules to improve the efficiency of the codec. For example, intra prediction/estimation, motion vector prediction, CAVLC (context-adaptive variable-length coding), and CABAC (context-adaptive binary arithmetic coding) (see, e.g., FIG. 14) may all use neighbor information for encoding according to the H.264 coding standard. As shown in FIG. 3, in some cases, top and left neighbor data may be needed, in other cases, top, left, top-left and top-right neighbor data may be needed, and in some cases top-right-right neighbor information may be needed.

Figure 2:
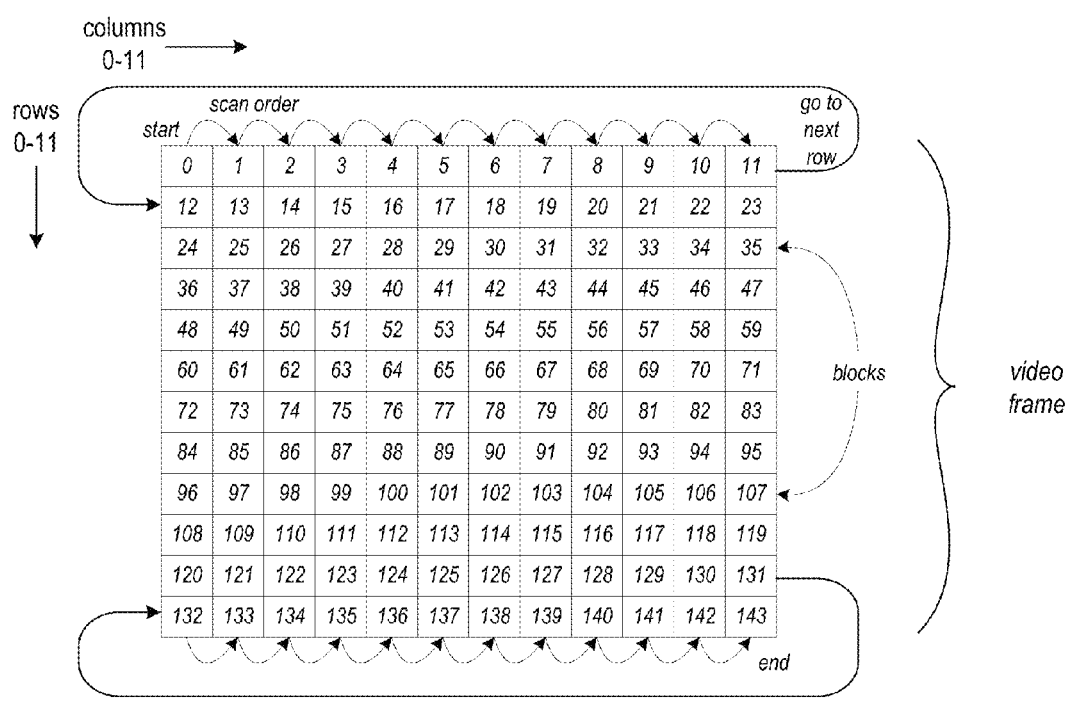
FIG. 2 illustrates conventional scan order processing of blocks from a video frame.

These requirements for information from neighbor block(s) may be referred to as dependencies. For example, referring to FIG. 3, information from the left neighbor of block (m,n) may be required to perform a particular operation on the block. In other words, the operation has a dependency on the left neighbor of the block being processed. Thus, a block processing operation being performed on a given block at one stage of a pipeline may have a dependency on a block being processed at another stage in the pipeline. However, when processing in scan order as in conventional pipelines (see, e.g., FIGS. 1 and 2), if an operation being performed on a block at a stage in the pipeline depends on the left neighbor, the left neighbor is currently being processed at the next (downstream) stage of the pipeline. The next stage may have to complete one or more operations before the information for the left neighbor is ready. Thus, the upstream stage may have to wait. This may cause undesired delays in the pipeline, as one stage may have to wait for a downstream stage to complete operations on a neighbor block before it can begin to process a block currently at the stage. Thus, dependencies may result in the need to wait for a downstream stage (e.g., the next stage) to complete one or more operations on a block (e.g., the left neighbor block) before the information can be provided to the operation to be performed on a block at an upstream stage of the pipeline.

In embodiments of the block processing pipeline methods and apparatus as described herein, rather than processing blocks in the pipeline according to scan order as in conventional methods, the blocks are processed in the pipeline according to knight's order, as shown in FIG. 3. Inputting the blocks into the pipeline in knight's order rather than scan order provides spacing (e.g., one or more stages) between adjacent blocks on a row in the pipeline. In other words, adjacent blocks on a row are not at adjacent stages of the pipeline when the blocks are input according to knight's order. In knight's order, rather than inputting block (m+1, n) into the pipeline immediately after block (m,n), the next block input to the pipeline is block (m−2,n+1), as shown in FIG. 3. As previously mentioned, the knight's order processing method may be constrained by the quadrow boundaries. When using quadrow boundaries with knight's order processing, the left neighbor of block (m,n) will be four stages downstream when block (m,n) is input to the pipeline; block (m,n) will be four stages downstream when block (m+1,n) is input to the pipeline. Thus, blocks that are adjacent on a row will be spaced well apart (four stages apart) in the pipeline. Thus, at stages in which operations are performed on a block that depend on left neighbor information, the information for the left neighbor is much more likely to be available than it would be if processing the blocks in scan order. In addition to spacing the blocks in the block processing pipeline so that adjacent blocks on a row are not concurrently processed at adjacent stages of the block processing pipeline, processing the blocks in knight's order as described above also spaces the blocks so that a given block and its top-left, top, and top-right neighbors are not concurrently processed at adjacent stages of the block processing pipeline.

Thus, the knight's order processing method, by providing spacing in the pipeline between adjacent blocks on a row, facilitates feedback of data from a downstream stage of the pipeline processing a first block to an upstream stage of the pipeline processing a second block that depends on the data from the first block.

In addition to dependencies on the left neighbor, one or more operations of a block processing method may depend on one or more of the neighbor blocks from the previous (or above) row such as the top neighbor, top-left neighbor, top-right neighbor, and top-right-right neighbor blocks as shown in FIG. 3. However, when processing the blocks in scan order, these blocks from the above row have already long before passed through the pipeline, and thus storing and accessing the required neighbor information may require considerable memory storage space and/or numerous accesses of external memory, which is expensive. The knight's order processing method with quadrow constraints provides locality of neighbor information that may be leveraged to provide local caching of neighbor data at each stage in relatively small buffers. For example, in at least some embodiments, a first buffer of sufficient size to cache the 13 previously processed blocks on the current quadrow (which may be referred to as the current quadrow buffer) and a second buffer of sufficient size to hold one or more of the neighbor blocks from the last row of the previous quadrow (which may be referred to as the previous quadrow buffer) may be sufficient to provide the required neighbor information at a stage. Moreover, using these local caching methods and apparatus, reads of and writes to external memory for neighbor data may only need to be performed once every four blocks (on quadrow boundaries). The caching methods and apparatus for neighbor data when processing blocks in knight's order in a pipeline are described later in this document in relation to FIGS. 9A through 11 in the section titled Caching neighbor data.

Determining a Next Block According to Knight's Order

In at least some embodiments, the basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, note that the knight's order processing method may also be implemented with other spacing than two blocks left, one block down (−2,+1). For example, instead of two blocks left, the method may be implemented to go three blocks left and one block down to get the next block (which would require going ten blocks to the right on the bottom row, assuming quadrow boundaries are used). As another example, the method may be implemented to go one block left and one block down (−1,+1) to get the next block. Generalizing, and assuming quadrow constraints, the algorithm may be stated as:

If not on the bottom row of a quadrow:
The next block is p columns left, one row down (−p,+1).
Otherwise, at the bottom row of a quadrow:
The next block is q columns right, three rows up (+q,−3).

Note that changing the value of p would affect the value of q. Furthermore, changing the value of p would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline.

Further, the knight's order processing method may also be implemented with other row constraints than quadrow constraints. In other words, row groups of at least two rows may be used in embodiments to constrain the knight's order processing method. Assuming r as the number of rows used to constrain the knight's order processing method, the algorithm may be further generalized as:

If not on the bottom row of a row group:
The next block is p columns left, one row down (−p,+1).
Otherwise, at the bottom row of a row group:
The next block is q columns right, (r−1) rows up (+q,−(r−1)).

Note that changing the value of r would also affect the value of q. Furthermore, changing the value of r would affect spacing between adjacent blocks from a row in the pipeline, and thus spacing between a given block and its left neighbor in the pipeline. In addition, changing the value of r would also affect spacing between the block and its other neighbor blocks (e.g., its top-left, top, and top-right neighbors).

Quadrow Processing According to Knight's Order

As previously mentioned, the blocks in a frame are divided into groups of rows, for example quadrows. Each of the above algorithms for determining a next block begins at an initial block. In some embodiments, the initial block may be the first (leftmost) block in the first (top) row of the first (top) quadrow. Upon reaching the end of a quadrow that is followed by another quadrow the algorithm jumps to the first block of the next quadrow and then jumps back and forth between the quadrow and the next quadrow for a few cycles, resulting in the interleaving of some blocks from the end of the quadrow with some blocks from the beginning of the next quadrow (see, e.g., FIG. 4A and FIG. 6B). In other words, the knight's order processing method treats the quadrows as if they were arranged end to end, as shown in FIG. 4B.

Figure 5:
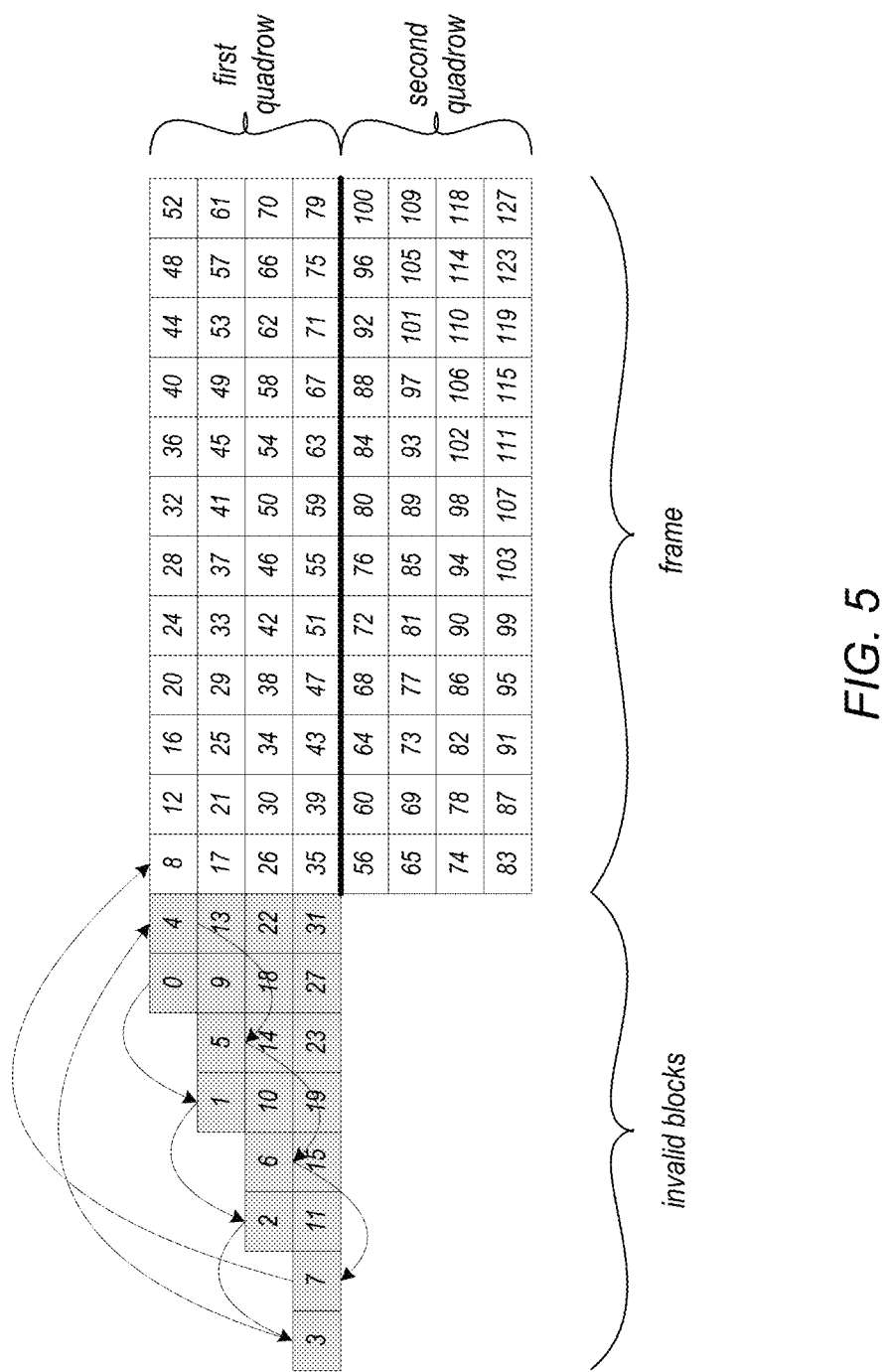
FIG. 5 graphically illustrates the knight's order processing method for an example frame in which additional invalid blocks are used at the start of a frame, according to at least some embodiments.

Note, however, the special cases at the beginning of the first quadrow and at the end of the last quadrow. Specifically, there are no blocks to the left of the first column of the first quadrow, and no blocks to the right of the last quadrow. The algorithm for determining a next block could be adjusted to handle these special cases; however, this would complicate the algorithm, and would also disrupt the spacing of the blocks in the pipeline at the beginning and end of the frame. To avoid such complications in the algorithm and to maintain consistent spacing of blocks in the pipeline, at least some embodiments may pad the beginning of the first quadrow and the end of the last quadrow with invalid blocks, for example as illustrated in FIGS. 4A-4B or FIG. 5. An invalid block may be defined as a block that is outside the boundary of the frame and that is input to the pipeline but that does not contain valid frame data, and thus is not processed at the stages. (Inputting invalid blocks into the pipeline results in "bubbles" in the pipeline as illustrated in FIG. 6). The algorithm for determining a next block as previously described may thus begin at an initial block, which may be either the first block in the top row of the first quadrow as shown in FIG. 4A or an invalid block to the left of the first block in the top row of the first quadrow as shown in FIG. 5, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline. Note that that last quadrow of the last video frame in a set of video frames being processed may still be padded with invalid blocks.

FIGS. 4A through 6B graphically illustrate the knight's order processing method, according to at least some embodiments. For simplicity, these Figures use an example 192×192 pixel frame divided into 144 16×16 pixel blocks, with 12 rows and 12 columns of blocks. However, it is to be noted that the knight's order processing method can be applied to input video frames of any dimensions. As just one example, a common video format to which embodiments may be applied is 1080 p (1920×1080 pixels, 2.1 megapixels). Note, however, that in some video formats, a dimension may not be evenly divisible by the block size, and thus may require padding, truncating, or some other adjustment. For example, in 1080 p format, 1080/16=67.5, and thus eight rows of pixels may be added to provide 68 rows of blocks, or alternatively eight rows of pixels may be removed to provide 67 rows of blocks.

In addition, once the frame is divided into rows of blocks, if the number of rows is not evenly divisible by four to achieve the quadrow constraint for knight's order processing (or, more generally, divisible by r, where r is the number of rows in the row groups used to provide the constraint), the frame may be padded with enough rows of invalid blocks (blocks that are put through the pipeline according to knight's order but that contain no valid data and thus are not processed at the stages) to fill the last quadrow. For example, if r=4, and if the input frames are 224×224 pixel frames, there are only 14 rows (3½ quadrows) of 16×16 pixel frames, and thus the frame may be padded (at the top or bottom) with two rows of invalid blocks so that there are 16 rows and 4 full quadrows available for processing according to the knight's order processing method using quadrow constraints. As another example, if the input frames are 1280×720 pixel frames, there are only 45 rows of blocks assuming r=4, and thus three extra rows of invalid blocks may be added.

FIGS. 4A and 4B graphically illustrate the knight's order processing method including the algorithm for determining a next block, according to at least some embodiments. In FIG. 4A, an example 192×192 pixel frame is divided into 144 16×16 pixel blocks, with 12 rows and 12 columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 4A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 4A) are input into the pipeline.

As shown in FIG. 4A, when the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 4B. Thus, the algorithm for determining a next block remains the same across the entire image.

FIG. 5 graphically illustrates the knight's order processing method when additional invalid blocks are used at the start of a frame, according to at least some embodiments. Only the first two quadrows are shown. In this example, each row of the first quadrow is padded with two extra invalid blocks. In this example, the numbers in the blocks represent the order in which the blocks are input to the block processing pipeline according to the knight's order processing method. However, instead of beginning with the first block in the top row of the first quadrow as shown in FIG. 4A, input to the pipeline begins with the invalid block (block 0) that is two to the left of the first block in top row of the first quadrow. Thus, eight invalid blocks (block 0 through 7) are input to the pipeline before the first block in the top row of the first quadrow (block 8, in FIG. 5) is input to the pipeline. The invalid blocks padding the last quadrow (not shown in this Figure) may remain the same as shown in FIG. 4A.

Figure 6A:
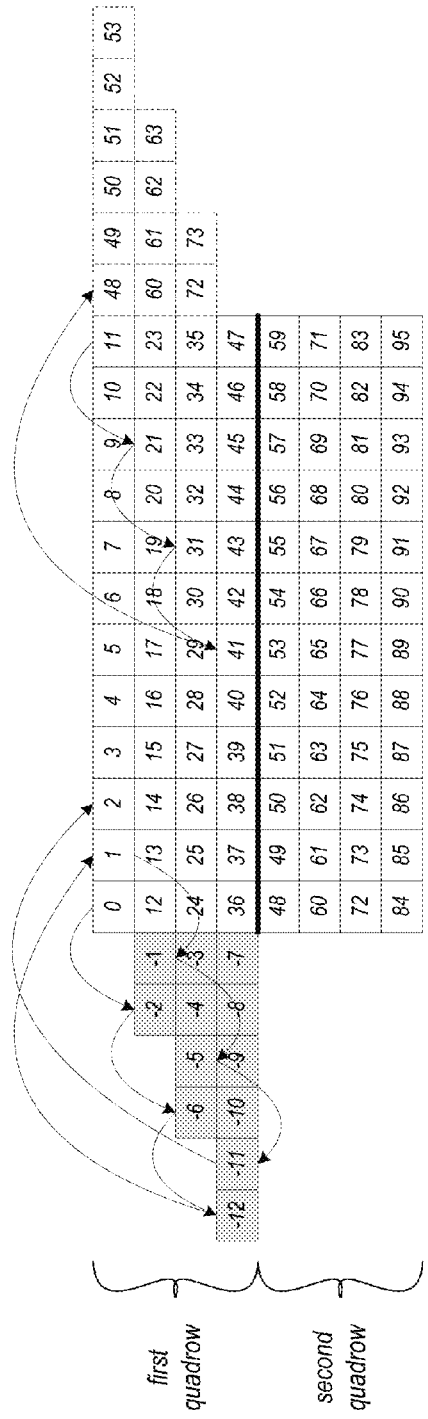
FIGS. 6A and 6B graphically illustrate the order of processing in a pipeline according to an embodiment of the knight's order processing method.
Figure 6B:
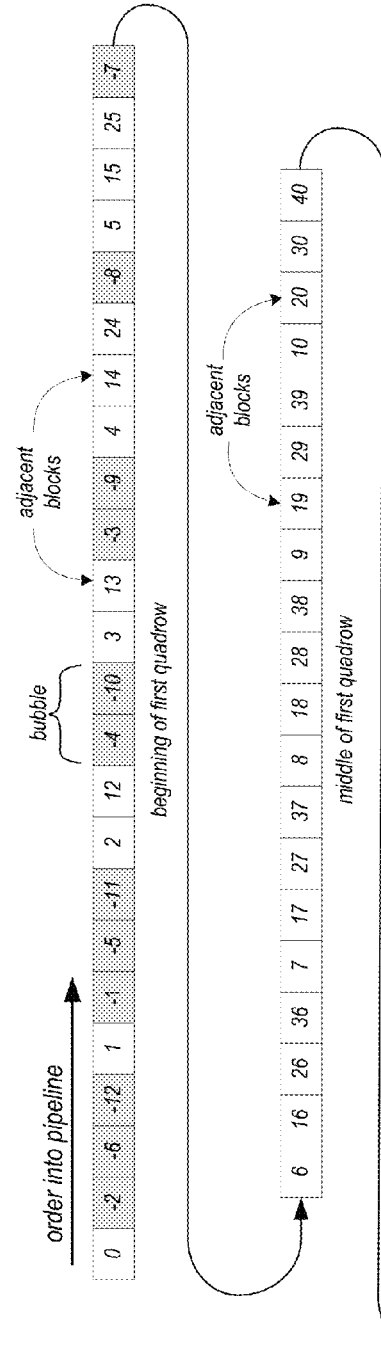

FIGS. 6A and 6B graphically illustrate the order of processing in a pipeline according to an embodiment of the knight's order processing method, and in addition show spacing between adjacent blocks in the pipeline and overlaps between quadrows in the pipeline. Only the first two quadrows are shown in FIG. 6A. In this example, instead of representing the order in which the blocks are input to the block processing pipeline, the numbers in the blocks represent the order of the blocks in the frame. In FIG. 6A, the blocks of the frame are shown with positive numbers, and invalid blocks that pad the first quadrow are shown with negative numbers. Otherwise, input to the pipeline is the same as described in reference to FIG. 4A. Block 0 (the first block in the top row of the first quadrow) is input to the first stage of the pipeline, and when the first stage is ready for another block, the method proceeds by going two columns left, one row down to get the next block for input (invalid block −2, in FIG. 6A). This pattern is repeated until reaching the bottom of the quadrow. At the bottom of the quadrow, the method goes seven columns right, three rows up to get the next block. When the end of the first quadrow is reached, the input algorithm proceeds to the beginning of the second quadrow. As shown in FIG. 6A, after block 41 is input, the method goes to block 48 (the first block of the second quadrow).

FIG. 6B shows the order of input of the blocks shown in FIG. 6A into the block processing pipeline according to the knight's order processing method. Block 0 is the first block into the pipeline, followed by invalid blocks −2, −6, and −12. After block −12, the method goes to the next block on the top row, in this example block 1. FIG. 6B shows all the blocks that are input up to block 54 in the second quadrow. As shown, the invalid blocks form bubbles in the pipeline at the beginning of the first quadrow. Also as shown, the end of the first quadrow overlaps with the beginning of the second quadrow. Note, however, that adjacent blocks in a row of the frame are always four apart. Thus, a given block's left neighbor (if it has one) will be four stages ahead of the block as the block proceeds through the pipeline.

Figure 7A:
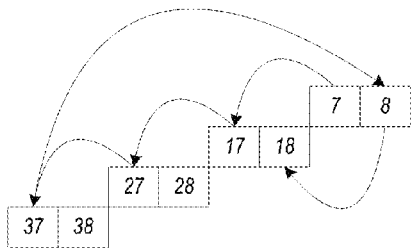
FIGS. 7A through 7D illustrate processing blocks from a video frame in a pipeline according to an embodiment of the knight's order processing method, and show feedback of information for an example dependency.
Figure 7C:
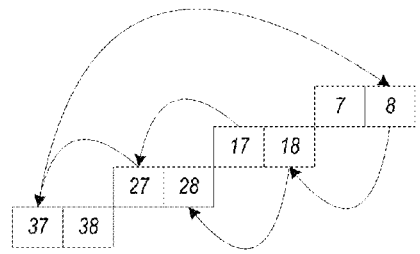
Figure 7B:
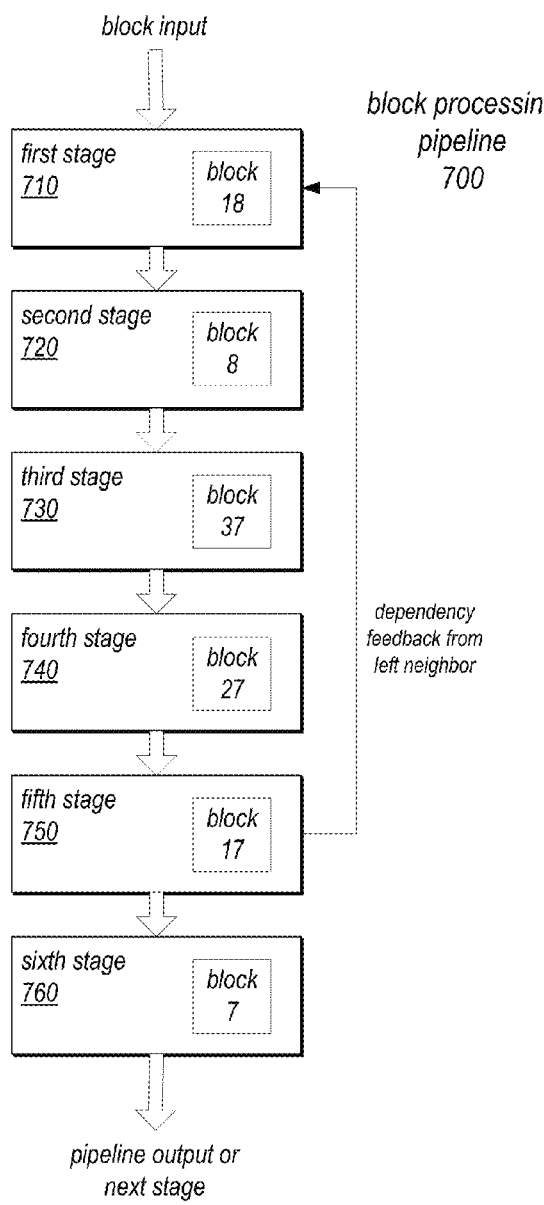
Figure 7D:
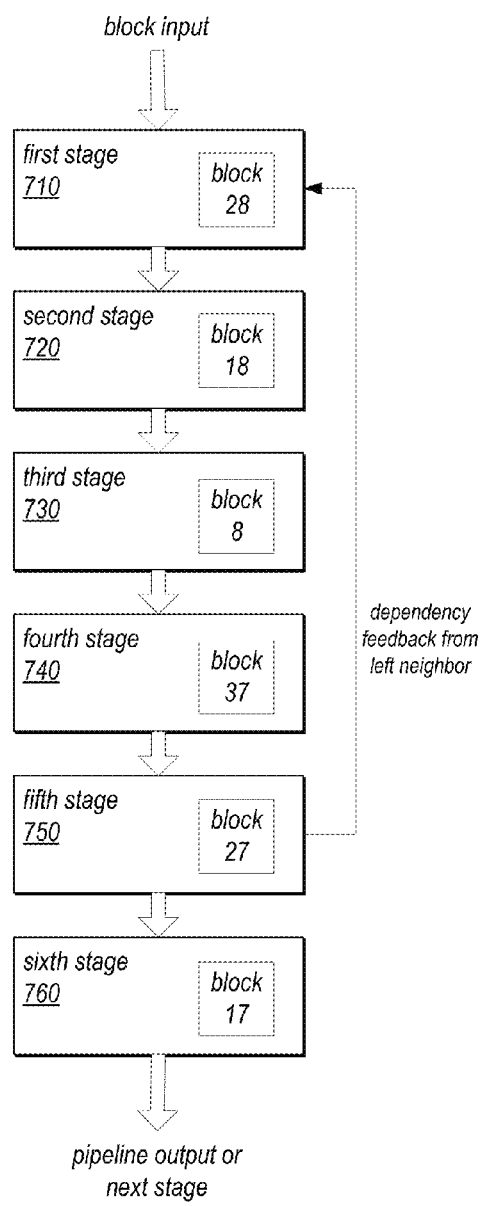

FIGS. 7A through 7D illustrate processing blocks from a video frame in a block processing pipeline according to an embodiment of the knight's order processing method, and show feedback of information for an example dependency. FIGS. 7B and 7D show an example block processing pipeline 700 that includes at least six stages. FIG. 7A graphically illustrates inputting six blocks from a quadrow to the block processing pipeline 700, beginning at block 7. As shown in FIG. 7B, the first input block (block 7) is at the sixth stage 760 of pipeline 700, and the last input block (block 18) is at the first stage 710 of the pipeline, with the other blocks 17, 27, 37, and 8 at stages 750, 740, 730, and 720 respectively. In this example, the processing of block 18 at the first stage 710 depends on information for its left neighbor (block 17). Block 17 is currently at the fifth stage 750, and so feedback is provided from stage 750 to stage 710.

FIGS. 7B and 7D graphically illustrate inputting the next block (block 28) from the quadrow to the block processing pipeline 700. In FIG. 7D, block 7 has gone to the next stage (not shown) or has been output from the pipeline 700, and blocks 17, 27, 37, 8, and 18 have all moved to the next stage in the pipeline. Block 28 has been input to the first stage 710. The processing of block 28 at the first stage 710 depends on information for its left neighbor (block 27). Block 27 is now at the fifth stage 750, and so feedback is provided from stage 750 to stage 710.

Figure 8A:
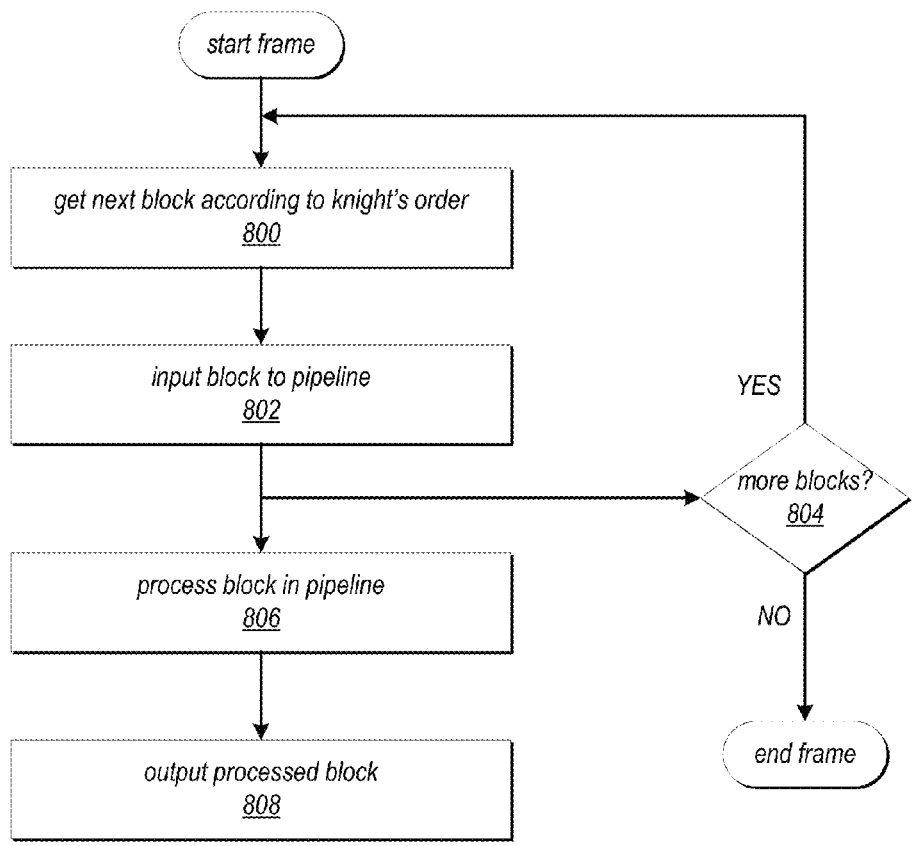
FIGS. 8A and 8B are high-level flowcharts of a knight's order processing method for a block processing pipeline, according to at least some embodiments.
Figure 8B:
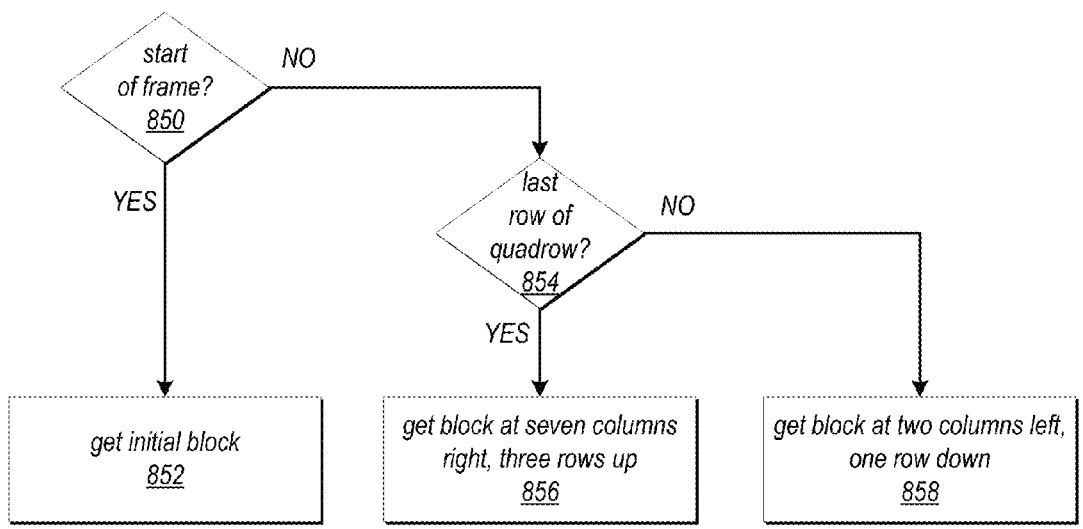

FIGS. 8A and 8B are high-level flowcharts of a knight's order processing method for a block processing pipeline, according to at least some embodiments. In FIG. 8A, as indicated at 800, a next block is determined according to the algorithm for determining a next input block that is implemented by the knight's order processing method. As indicated at 802, the block is input to the pipeline, for example from a memory via direct memory access (DMA). As shown by 804, the input process of elements 800 and 802 continues as long as there are blocks to be processed. Each block that is input to the pipeline by elements 800 and 802 is processed in the pipeline, as indicated at 806. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. Note that invalid blocks that are input to the pipeline, for example at the beginning of the first quadrow and at the end of the last quadrow, pass through the pipeline as "bubbles", but contain no valid data and thus are not processed at the stages as they traverse the pipeline. As indicated at 808, once a block has been processed by a last stage of the pipeline, the processed block is output, for example to a memory via direct memory access (DMA).

FIG. 8B is a flowchart of an example algorithm for determining a next input block that may be implemented by the knight's order processing method, and expands on element 800 of FIG. 8A. FIG. 8B assumes that the frame is divided into quadrows; however, other row groupings may be used. FIG. 8B also assumes that the basic knight's order algorithm used to determine the next frame is two columns left, one row down (−2,+1) if not on the bottom row of a quadrow, seven columns right, three rows up (+7,−3) if on the bottom row. However, other spacing may be used. At 850, if at the start of the frame, the method gets an initial block as indicated at 852. In some embodiments, the initial block may be the first block of the top row of the first quadrow, as shown in FIG. 4A. Alternatively, in some embodiments, the initial block may be an invalid block to the left of the first block of the top row of the first quadrow, as shown in FIG. 5. If this is not the start of the frame, then at 854, if this is the last row of the quadrow, then the next block is seven columns right, three rows up, as indicated at 856. If this is not the last row of the quadrow, then the next block is two columns left, one row down, as indicated at 858.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow (or other row grouping) constraints provides locality of neighbor information that may be leveraged to provide local caching of neighbor data at each stage of the pipeline in relatively small buffers. FIGS. 9A through 11 illustrate caching methods and apparatus using local buffers to provide access to neighbor data at one or more stages of a block processing pipeline, according to at least some embodiments. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

Current Quadrow Buffer

In at least some embodiments of a block processing pipeline that implements the knight's order processing method as described above, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. (If the top-left neighbor information is not required, C=9 would be sufficient to include the top neighbor of the current block). When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 9A:
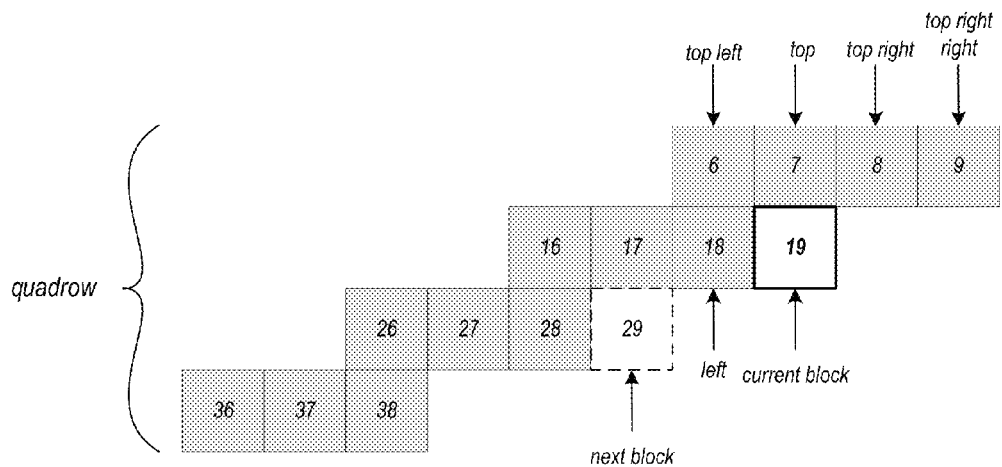
FIGS. 9A through 9C graphically illustrate a caching method and apparatus for neighbor data on a quadrow, according to at least some embodiments.
Figure 9B:
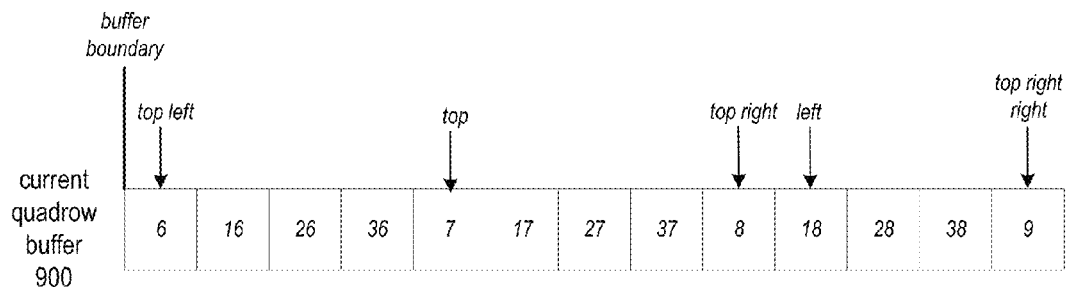
Figure 9C:
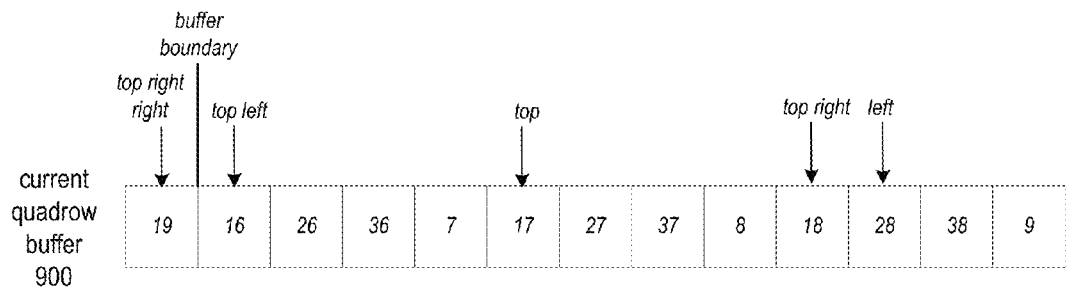

FIGS. 9A through 9C graphically illustrate a caching method and apparatus for neighbor data on a quadrow, according to at least some embodiments. FIG. 9A shows a portion of a quadrow as processed in a pipeline according to the knight's order processing method. Block 19 represents a current block at a stage. The shaded blocks represent the 13 most recently processed blocks by the stage. Block 18 is block 19's left neighbor, and blocks 6, 7, 8, and 9 are block 19's top-left, top, top-right, and top-right-right neighbors, respectively. Note that the farthest block from block 19 in time is its top-left neighbor (block 6), and the nearest block in time is its top-right-right neighbor (block 9). Block 29 is the next block to be processed at the stage according to the knight's order method.

FIG. 9B shows the current quadrow buffer 900 for the current block (block 19) at the stage. Buffer 900 includes 13 entries, from an oldest entry (block 6) to a newest entry (block 9). The stage can access block 19's top-left, top, top-right, and top-right-right neighbor information from the positions indicated.

FIG. 9C shows the current quadrow buffer 900 for the next block (block 29) at the stage. When the stage completes processing of block 19, the entry for the oldest block (block 6, in FIG. 9B) is overwritten with the information for block 19. The oldest entry is now block 16 (block 29's top-left neighbor), and the newest entry is now block 19 (block 29's top-right-right neighbor). The stage can access block 29's top-left, top, top-right, and top-right-right neighbor information from the positions indicated. Note that the buffer boundary has been advanced one position.

Previous Quadrow Buffer

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow.

To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The previous quadrow buffer may be of sufficient size to hold one or more of the neighbor blocks from the last row of the previous quadrow that may be needed by the block processing method. The number of entries in the previous quadrow buffer, as well as the particular neighbor blocks that are cached in the previous quadrow buffer, may be dependent on the requirements of the particular block processing method that is implemented by the block processing pipeline. For example, in implementations where the top-top-right neighbor information is needed, the previous quadrow buffer may include at least four entries (top-left, top, top-right, and top-right-right). As another example, in implementations where the top-top-right neighbor information is not needed, the previous quadrow buffer may only include three entries (top-left, top, and top-right).

When processing a quadrow according to the knight's order processing method, information for each block on the bottom row of the quadrow may be written to an external memory, for example via direct memory access (DMA). In at least some embodiments, the information for each block on the bottom row of the quadrow may be written to a neighbor data structure in external memory when the block is at a last stage of the pipeline. Thus, there may be a write to the neighbor data structure in external memory once every four blocks. For each block in the top row of a quadrow, top-right-right neighbor data may be read from the neighbor data structure in external memory and written to the previous quadrow buffer of the first stage. In at least some embodiments, the read from external memory and write to the previous quadrow buffer may be performed at a first stage of the pipeline when a block in the top row of a quadrow is at the first stage. Thus, there may be a read from the neighbor data structure in external memory once every four blocks. In at least some embodiments, the contents of the previous quadrow buffer may be passed down the pipeline to the other stages along with the corresponding block from the top row.

In at least some embodiments, the memory to which information for each block on the bottom row of the quadrow is written may be a memory external to the stage at which the write is performed. In various embodiments, the memory may be a memory of the pipeline component itself, a memory of a video encoder that implements the pipeline, or a memory external to the video encoder. In some embodiments, however, the memory to which information for each block on the bottom row of the quadrow is written may be a local memory of a stage of the pipeline, for example the last stage.

FIGS. 10A through 10D graphically illustrate methods and apparatus for caching neighbor data from a previous quadrow in a block processing pipeline, according to at least some embodiments. These Figures assume that four neighbor blocks from the previous row (top-left, top, top-right, and top-right-right) are needed by the block processing method. However, the number of entries in the previous quadrow buffer, as well as the particular neighbor blocks that are cached in the previous quadrow buffer, may vary depending on the requirements of the particular block processing method that is implemented by the block processing pipeline.

Figure 10A:
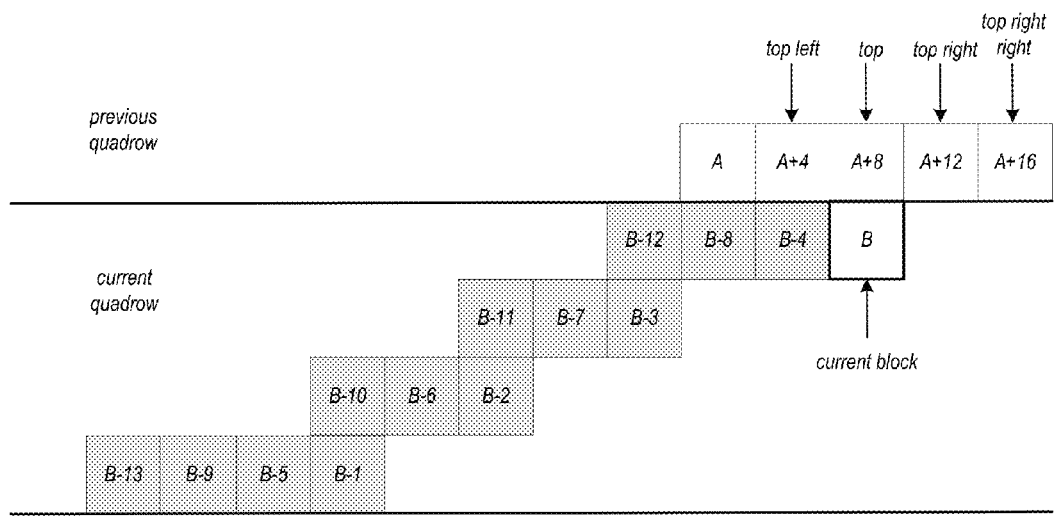
FIGS. 10A through 10D graphically illustrate methods and apparatus for caching neighbor data from a previous quadrow in a block processing pipeline, according to at least some embodiments.

FIG. 10A graphically illustrates blocks in a current quadrow being processed according to the knight's order processing method, as well as neighbor blocks in the last row of the previous quadrow. Blocks A, A+4, A+8, A+12, and A+16 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. Note that B−4 is current block B's left neighbor. However, block B's top-left (block A+4), top (block A+8), top-right (block A+12), and top-right-right (block A+16) neighbors are on the bottom row of the previous quadrow, and are not included in the current quadrow buffer for block B.

In at least some embodiments, to provide previous row neighbor information, for example top-left, top, top-right, and top-right-right neighbor information, for blocks on the top row of the current quadrow, a second buffer, referred to as a previous quadrow buffer, may be implemented at each of one or more stages of the pipeline. When processing a quadrow, information for each block on the bottom row of the quadrow, for example blocks A, A+4, A+8, A+12, and A+16 of the previous quadrow as shown in FIG. 10A, is written to a neighbor data structure in external memory. In at least some embodiments, a last stage of the pipeline may perform the write to external memory for each block in the bottom row of a quadrow. Thus, the write to external memory is performed once every four blocks. In at least some embodiments, the neighbor data structure may be a circular data structure, and the information for a block written to the external memory may overwrite an oldest entry in the data structure.

When processing blocks from the top row of a next quadrow (e.g., blocks B-12, B-8, B-4, and B in FIG. 10A), information for neighbor blocks in the bottom row of the previous quadrow (e.g., blocks A, A+4, A+8, A+12, and A+16 in FIG. 10A) is read from the external memory and cached in the previous quadrow buffer. In at least some embodiments, a first stage of the pipeline may perform the read from external memory and write to the previous quadrow buffer for each block in the top row of a quadrow. In at least some embodiments, information for the top-right-right neighbor block of the block in the top row that is currently at the stage is read from the external memory and written to the previous quadrow buffer. In at least some embodiments, the previous quadrow buffer is a circular buffer, and an oldest entry in the previous quadrow buffer is replaced with the top-right-right neighbor information. In at least some embodiments, the neighbor information in the previous quadrow buffer is passed from the first stage down the pipeline to the other stages along with the corresponding block from the top row of the quadrow.

Figure 10B:
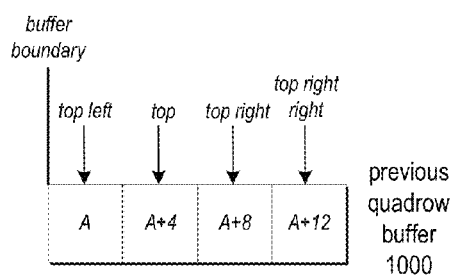
Figure 10C:
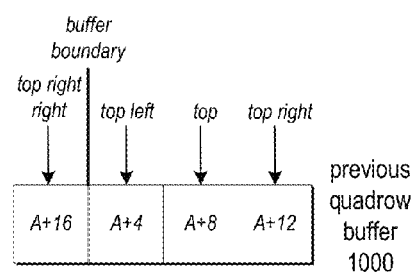

FIGS. 10B and 10C graphically illustrate a previous quadrow buffer 1000, according to at least some embodiments. FIG. 10B shows the state of the previous quadrow buffer 1000 at a stage of the pipeline for block B-4 of FIG. 10A. Note that blocks A, A+4, A+8, and A+12 are block B-4's top-left, top, top-right, and top-right-right neighbors, respectively. FIG. 10C shows the state of the previous quadrow buffer 1000 at a stage of the pipeline for block B of FIG. 10A. Note that blocks A+4, A+8, A+12, and A+16 are block B's top-left, top, top-right, and top-right-right neighbors, respectively. In the knight's order processing method, four blocks or cycles after B-4 enters the pipeline, block B is input to the pipeline. Information for block B's top-right-right neighbor (block A+16) is read from the neighbor data structure in external memory and written to the previous quadrow buffer 1000, overwriting the oldest entry in previous quadrow buffer 1000 (in this case, block A). The neighbor information in previous quadrow buffer 1000 as shown in FIG. 10C may then be passed down the pipeline to other stages along with block B. In some embodiments, the entire contents of previous quadrow buffer 1000 may be passed to the next stage(s) with block B. Alternatively, only the information for block B's top-right-right neighbor (block A+16) may be passed to the next stage(s) with block B.

Figure 10D:
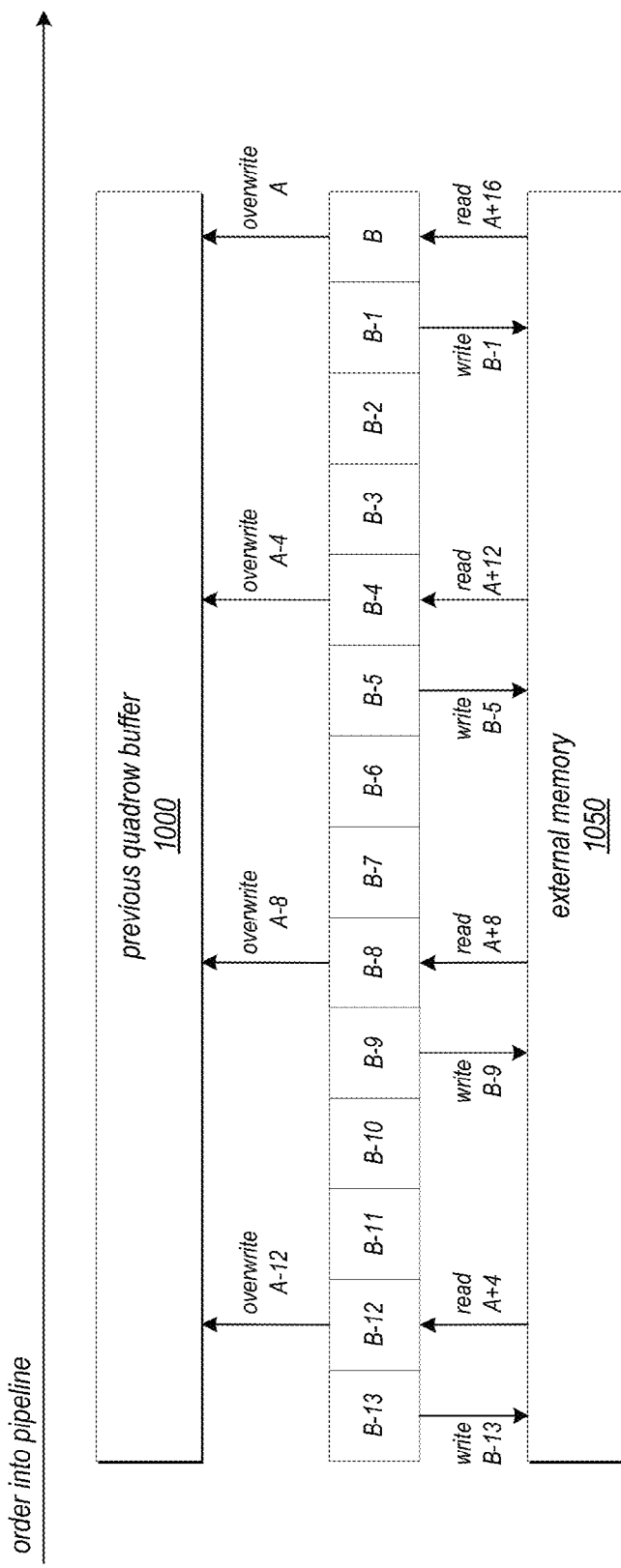

FIG. 10D graphically illustrates writing neighbor data to and reading neighbor data from an external memory according to the knight's order processing method in a block processing pipeline, according to at least some embodiments. In FIG. 10D, the fourteen blocks shown in the current quadrow of FIG. 10A are shown in the order that they are input to the pipeline according to the knight's order processing method. Block B-13 was the first block input to the pipeline, and block B is the most recent block input into the pipeline. As shown in FIG. 10A, blocks B-13, B-9, B-5, and B-1 are all on the bottom row of the current quadrow, while blocks B-12, B-8, B-4, and B are all on the top row of the current quadrow.

As shown in FIG. 10D, for blocks B-13, B-9, B-5, and B-1 on the bottom row of the quadrow, neighbor information is written to an external memory 1050 to be used as top neighbor information for the top row of the next quadrow. For example, the neighbor information for these blocks may be written to the external memory 1050 when the blocks are at a last stage of the pipeline. Thus, a write to external memory is performed once every four blocks. In various embodiments, external memory 1050 may be a memory of the pipeline component that is external to the last stage, a memory of a video encoder that implements the pipeline, or a memory external to the video encoder. In some embodiments, however, memory 1050 may be a local memory of the last stage of the pipeline.

As shown in FIG. 10D, for blocks B-12, B-8, B-4, and B on the top row of the quadrow, neighbor information is read from the external memory 1050 and cached in the previous quadrow buffer 1000. In at least some embodiments, the neighbor information for these blocks may be read from external memory 1050 and cached in the previous quadrow buffer 1000 at a first stage of the pipeline. In at least some embodiments, the information for the current block's top-right-right neighbor in the previous quadrow is read from the external memory 1050 and cached in the previous quadrow buffer 1000. In at least some embodiments, the neighbor information read from external memory 1050 and cached in previous quadrow buffer 1000 overwrites an oldest entry in the previous quadrow buffer 1000. In at least some embodiments, the oldest entry that is overwritten may correspond to the top-left neighbor of the previous block on the top row. Thus, a read from external memory is performed once every four blocks.

For example, when block B-12 enters the pipeline, information for block A+4 from the previous quadrow as shown in FIG. 10A may be read from the external memory 1050 and cached to the previous quadrow buffer 1000, overwriting information for a block A-12 that was previously cached to the buffer 1000. When block B-8 enters the pipeline four blocks later, information for block A+8 from the previous quadrow may be read from the external memory 1050 and cached to the previous quadrow buffer 1000, overwriting information for a block A-8 that was previously cached to the buffer 1000. When block B-4 enters the pipeline four blocks later, information for block A+12 from the previous quadrow may be read from the external memory 1050 and cached to the previous quadrow buffer 1000, overwriting information for a block A-4 that was previously cached to the buffer 1000. When block B enters the pipeline four blocks later, information for block A+16 from the previous quadrow may be read from the external memory 1050 and cached to the previous quadrow buffer 1000, overwriting information for block A that was previously cached to the buffer 1000.

While not shown in FIG. 10D, at least some embodiments may include an interlock mechanism to control the reads and writes to external memory 1050 between rows. In some cases, for example in the cases of narrow input frames, the pipeline may be stalled because a write to external memory cannot proceed until a read has been performed to avoid overwriting the data in external memory 1050. This may happen, for example, because the memory 1050 may operate on a different clock than the pipeline and may serve other clients, and memory latency may be long enough such that a read from memory 1050 is delayed and the pipeline gets ahead on the writes to 1050. The interlock mechanism holds the write at the pipeline until the read is complete. In at least some embodiments, the interlock mechanism may be implemented as a counter that is incremented by the read process of the pipeline and decremented by the write process; a lock is held on the write if the value of the counter is greater than a specified value to avoid an overwrite. The lock is released when the value of the counter drops to or below the specified value.

Figure 11:
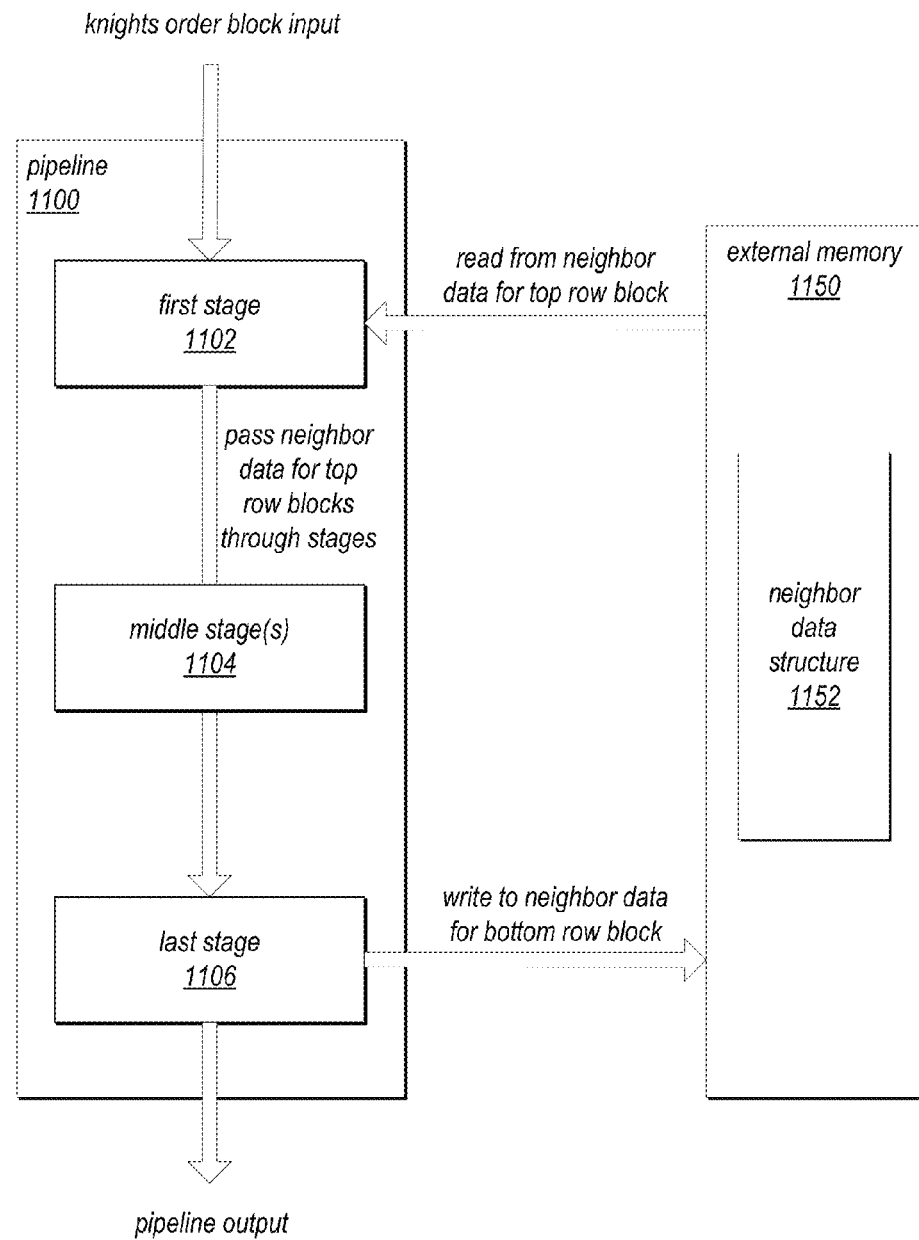
FIG. 11 illustrates reading neighbor data from and writing neighbor data to an external memory in an example block processing pipeline, according to at least some embodiments.

FIG. 11 illustrates reading neighbor data from and writing neighbor data to an external memory in an example block processing pipeline, according to at least some embodiments. A block processing pipeline 1100 may include a first stage 1102, one or more middle stages 1104, and a last stage 1106. Blocks from a frame may be input to the pipeline 1100 according to a knight's order processing method including quadrow constraints as previously described. For blocks in the top row of a quadrow, neighbor data for the blocks may be read from a neighbor data structure 1152 in an external memory 1150 (for example, via DMA) and cached in a previous quadrow buffer at first stage 1102. In at least some embodiments, the cached neighbor data may be passed from first stage 1102 to the other stages in the pipeline 1100 along with the respective top-row block. For blocks in the bottom row of a quadrow, information for the blocks may be written to the neighbor data structure 1152 in an external memory 1150 for use as neighbor data for blocks in the top row of a next quadrow. In various embodiments, external memory 1150 may be a memory of the pipeline component that is external to the last stage 1106, a memory of a video encoder that implements the pipeline, or a memory external to the video encoder. In some embodiments, however, memory 1150 may be a local memory of the last stage of the pipeline.

Figure 12:
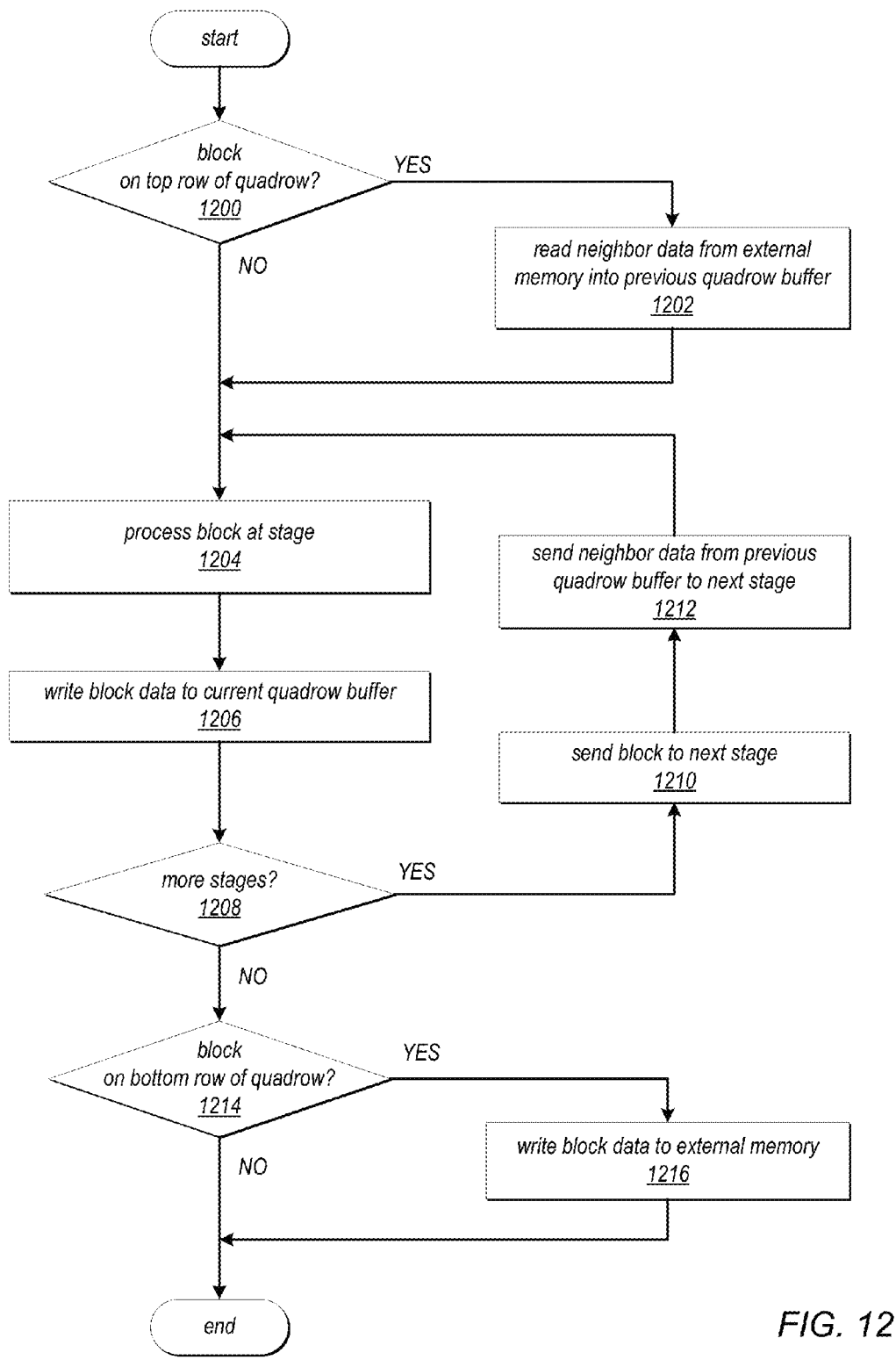
FIG. 12 is a flowchart of a method for processing blocks in a block processing pipeline in which neighbor data is cached in local buffers at the stages of the pipeline, according to at least some embodiments.

FIG. 12 is a flowchart of a method for processing blocks in a block processing pipeline in which neighbor data is cached in local buffers at the stages of the pipeline, according to at least some embodiments. For example, the method of FIG. 12 may be used at element 806 of FIG. 8A to process blocks input to the pipeline according to the knight's order processing method as shown at elements 800, 802, and 804 of FIG. 8A.

In FIG. 12, a block is input to the pipeline. At 1200, at a first stage of the pipeline, if the block is on the top row of a quadrow, then neighbor data for the block may be read from external memory (for example, via DMA) into a previous quadrow buffer as indicated at 1202. In at least some embodiments, the neighbor data corresponds to the top-right-right neighbor of the current block on the bottom row of the previous quadrow. As indicated at 1204, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 1206, information about the current block may be written to the current quadrow buffer at the stage for use on subsequent blocks. The information may overwrite an oldest entry in the current quadrow buffer.

At 1208, if there are more stages, then the block may be sent to a next stage, as indicated at 1210. At 1212, neighbor information from the previous quadrow buffer may also be sent to the next stage. In at least some embodiments, this neighbor information is only sent to the next stage if the current block is on the top row of a quadrow. Elements 1204 through 1212 may be repeated until the block reaches and is processed by a last stage of the pipeline.

At 1208, if there are no more stages, then processing of the block in the pipeline is done. At 1214, if the block is on the bottom row of a quadrow, then information for the block is written to an external memory (for example, via DMA) to be read as neighbor data for blocks in the top row of a next quadrow. In at least some embodiments, the memory to which information for each block on the bottom row of the quadrow is written may be a memory external to the stage at which the write is performed. In some embodiments, however, the memory to which information for each block on the bottom row of the quadrow is written may be a local memory of a stage of the pipeline. In addition, all of the processed valid blocks are output as shown by element 808 of FIG. 8A.

Handling Special Cases

The top and bottom rows of blocks in a frame, as well as the left and right sides of the frame, may present special cases that need to be handled, for example when caching neighbor data.

As previously noted, in the knight's order processing method, the first quadrow may be padded on the left with invalid blocks, and the last quadrow may be padded on the right with invalid blocks, to facilitate knight's order processing. In addition, once the frame is divided into rows of blocks, if the number of rows is not evenly divisible by four to achieve the quadrow constraint for knight's order processing (or, more generally, divisible by r, where r is the number of rows in the row groups used to provide the constraint), the frame may be padded with enough rows of invalid blocks to fill the last quadrow. In addition, the quadrows may be handled as if they are laid end-to-end as shown in FIGS. 4A and 4B, with overlapping between adjacent quadrows. These features allow the knight's order input algorithm (see the section titled Determining a next block according to knight's order) to proceed from an initial block to the last block of the frame without any special cases to handle.

However, bubbles are introduced into the pipeline due to the invalid blocks that are input, as illustrated in FIG. 6B. The stages do not process the invalid blocks in the bubbles. However, in at least some embodiments, at least some operations involved in maintaining the current row buffer and previous row buffer as described above in the section titled Caching neighbor data may be performed for the invalid blocks. Thus, the neighbor data structure in external memory, the previous row buffer, and the current row buffer may include one or more entries that correspond to invalid blocks that passed through the pipeline without processing.

Handling the Top Row of the First Quadrow

The top row of the first quadrow does not have any valid neighbor blocks above it. However, as previously described, neighbor data is read from external memory for blocks on the top row of quadrows. In some embodiments, this read from external memory may not be performed for the blocks on the top row of the first quadrow. Alternatively, the read may be performed, with invalid block data being provided.

Handling Left and Right Edges

As previously described, neighbor data is read from external memory for blocks on the top row of the quadrows. In at least some embodiments, at each block on the first row, the block's top-right-right neighbor information is read from external memory into a previous quadrow buffer. However, for the last two blocks in the row, the blocks do not have valid top-right-right neighbors. In addition, for the first block in the row, the block's top and top-right neighbor would not have been read in from external memory and thus would not be present in the previous quadrow buffer when needed.

In some embodiments, to overcome the above, at the last two blocks in the top row of a quadrow, neighbor information corresponding to the first two blocks of the bottom row of the quadrow may be read from external memory into the previous quadrow buffer. Thus, when the top-right-right neighbor information is read in from external memory for the first block of the top row of the next quadrow, the previous quadrow buffer already contains the top and top-right neighbor information for the block.

Alternatively, at the first block of the top row of a quadrow, the information for the top, top-right, and top-right-right neighbors may be read in from external memory. For the last two blocks in the top row of a quadrow, either the read from external memory is not performed or the read is performed returning invalid block data.

Handling the Bottom Row of the Last Quadrow

There are no quadrows below the bottom row of the last quadrow. However, as previously described, information for the blocks on the bottom row of a quadrow is written to external memory for use by the next quadrow. In some embodiments, this write to external memory may not be performed for the blocks in the last quadrow. Alternatively, the write may be performed, even though the information will not be used.

Parallel Pipeline Implementations

Embodiments of the block processing methods as described herein may be implemented in two or more parallel block processing pipelines. For example, 2, 4, 8, or more pipelines may be configured to run in parallel, with each pipeline processing a quadrow from an input video frame in knight's order. In at least some embodiments, each quadrow processed by a pipeline may be padded at the beginning with invalid blocks, for example as shown for the quadrow in FIGS. 4A and 5. In some embodiments, the start of knight's order input of the quadrows to the parallel pipelines may be staggered by some number of macroblocks. In other words, knight's order input of a first quadrow may begin to a first pipeline, with knight's order input of a second quadrow to a second pipeline delayed by one or more blocks or cycles, and so on. In at least some embodiments, the parallel pipelines may share a memory to which a first pipeline processing a quadrow writes information for blocks on the bottom row of the quadrow, and from which a second pipeline processing a next quadrow reads information for above-row neighbor blocks for blocks on the top row of the next quadrow that were written to the memory by the first pipeline. The beginning of block input to the second pipeline may be delayed by an appropriate number of blocks to allow the required neighbor information (e.g., the top-left, top, and/or top-right neighbor inform) to be available in the shared memory when the second pipeline requires the information.

Example Pipeline Units

Figure 13A:
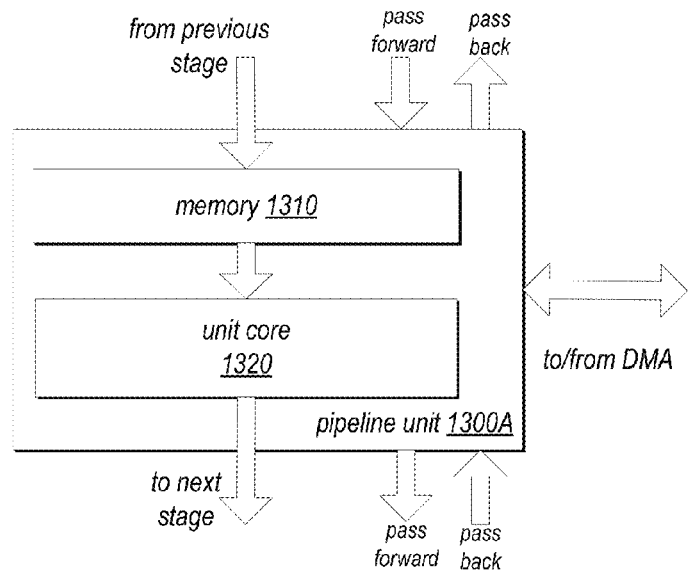
FIGS. 13A and 13B are block diagrams of example pipeline processing units that may be used at the stages of a block processing pipeline that implements the knight's order processing method, according to at least some embodiments.
Figure 13B:
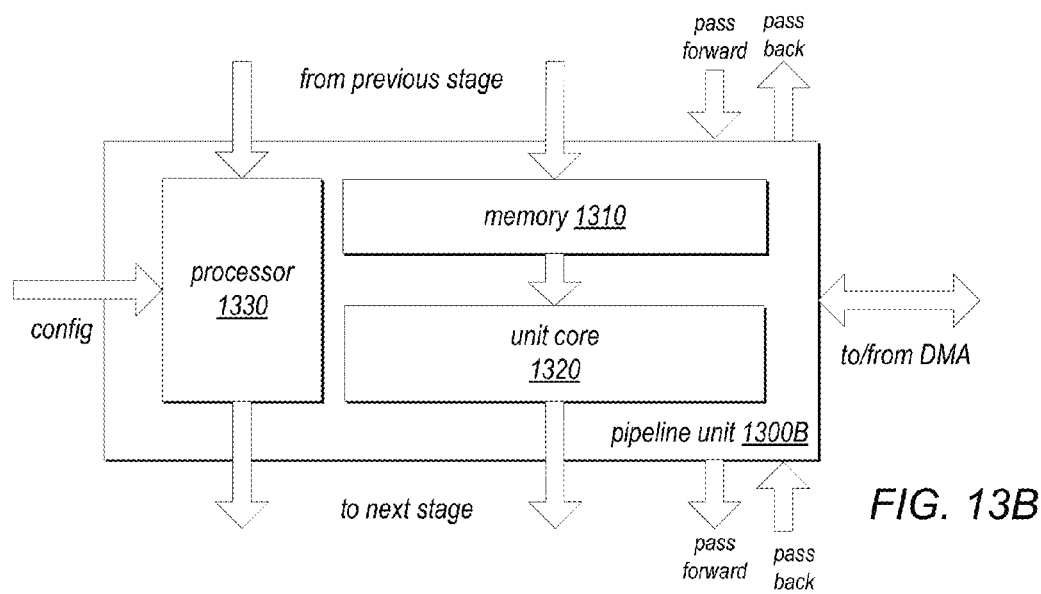
Figure 13C:
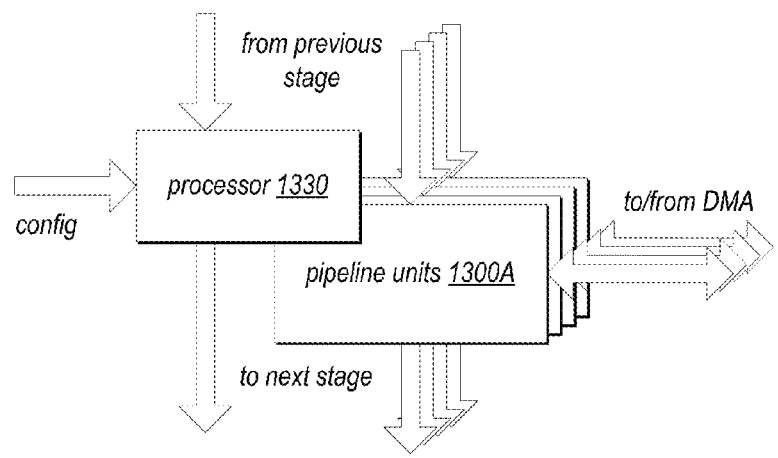
FIG. 13C shows that a single processor may be associated with a group of two or more pipeline units.

FIGS. 13A through 13C are block diagrams of example pipeline processing units that may be used at the stages of a block processing pipeline that implements the knight's order processing method, according to at least some embodiments. For example, one or more of pipeline units 1300A and/or 1300B as shown in FIGS. 13A and 13B may be used at each stage of the example block processing pipeline shown in FIG. 14. Note that FIGS. 13A through 13C are not limiting; a pipeline processing unit may include more or fewer components and features than those shown in the Figures.

As shown in FIG. 13A, a pipeline unit 1300A may include at least a memory 1310 and a unit core 1320. Unit core 1320 may be a component (e.g., a circuit) that is configured to perform a particular operation on or for a block, or a portion of a block, at a particular stage of the block processing pipeline. Memory 1310 may, for example, be a double-buffered memory that allows the unit core 1320 to read and process data for a block from the memory 1310 while data for a next block is being written to the memory 1310 from a previous pipeline unit.

As shown in FIG. 13B, a pipeline unit 1300B, in addition to a memory 1310 and unit core 1320 as shown in FIG. 13A, may also include a processor 1330. Processor 1330 may, for example, be a mobile or M-class processor. The processors 1330 in pipeline units 1300B of a block processing pipeline may, for example, be used to control the block processing pipeline at block boundaries. The processors 1330 in pipeline units 1300B may be configurable, for example with low-level firmware microcode, to allow flexibility in algorithms that are implemented by the block processing pipeline for various applications.

In at least some embodiments, a processor 1330 of a pipeline unit 1300B in the pipeline may be configured to receive data from a processor 1330 of a previous (upstream) pipeline unit 1300B and send data to a processor 1330 of a subsequent (downstream) pipeline unit 1300B. In addition, a processor 1330 of a pipeline unit 1300B at a last stage of the pipeline may be configured to send feedback data to a processor 1330 of a pipeline unit 1300B at a first stage of the pipeline.

As shown in FIGS. 13A and 13B, a pipeline unit 1300A or 1300B may be configured to access external memory, for example according to direct memory access (DMA). In addition, a pipeline unit 1300A or 1300B may be configured to pass information back to one or more previous (upstream) stages of the pipeline and/or to receive information passed back from one or more subsequent (downstream) stages of the pipeline. In addition, a pipeline unit 1300A or 1300B may be configured to pass information forward to one or more subsequent (downstream) stages of the pipeline and/or to receive information passed forward from one or more previous (upstream) stages of the pipeline.

As shown in FIG. 13C, two or more units 1300A as shown in FIG. 13A may be grouped together and configured to perform an operation in the pipeline. A single processor 1330 may be used to control and/or configure the pipeline units 1300A.

Example Block Processing Pipeline

FIG. 14 is a high-level block diagram of general operations in an example block processing method 1400 for H.264 encoding that may be implemented in stages by a block processing pipeline that implements the knight's order processing method, according to at least some embodiments. A block processing pipeline that implements the block processing method 1400 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080 p (1920×1080 pixels, 2.1 megapixels) encoded in YCbCr color space. However, other input video formats may be encoded into H.264 using embodiments of the pipeline in a video encoder apparatus.

Figure 15:
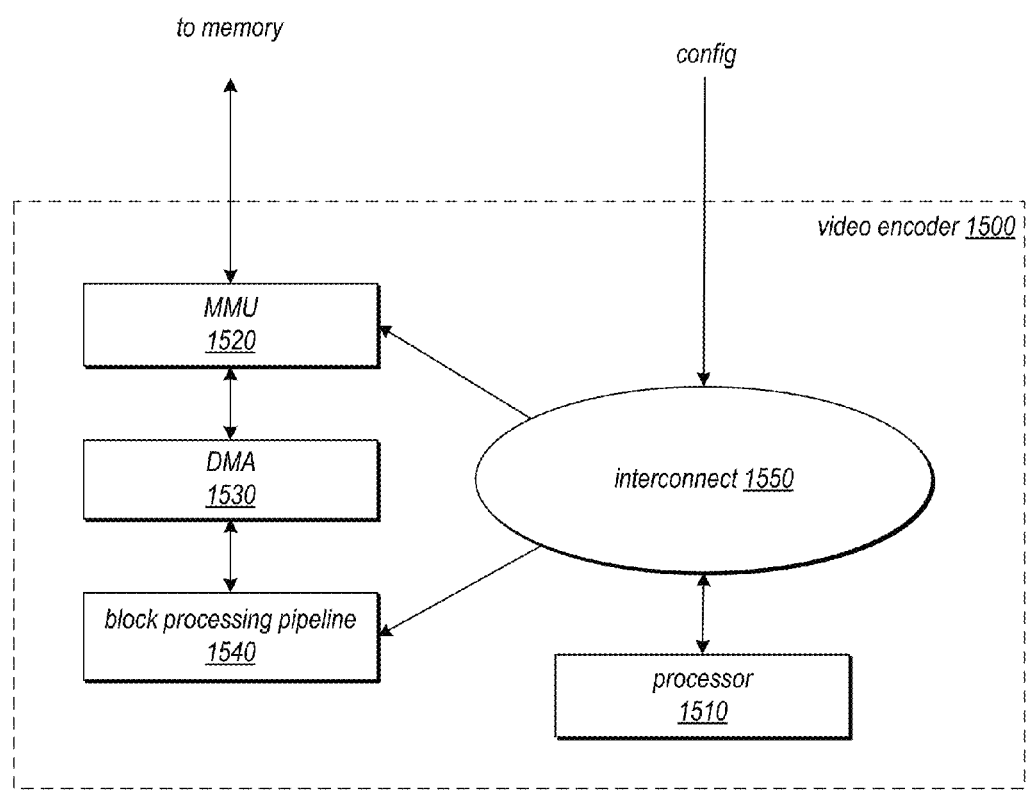
FIG. 15 is a block diagram of an example video encoder apparatus, according to at least some embodiments.
Figure 16:
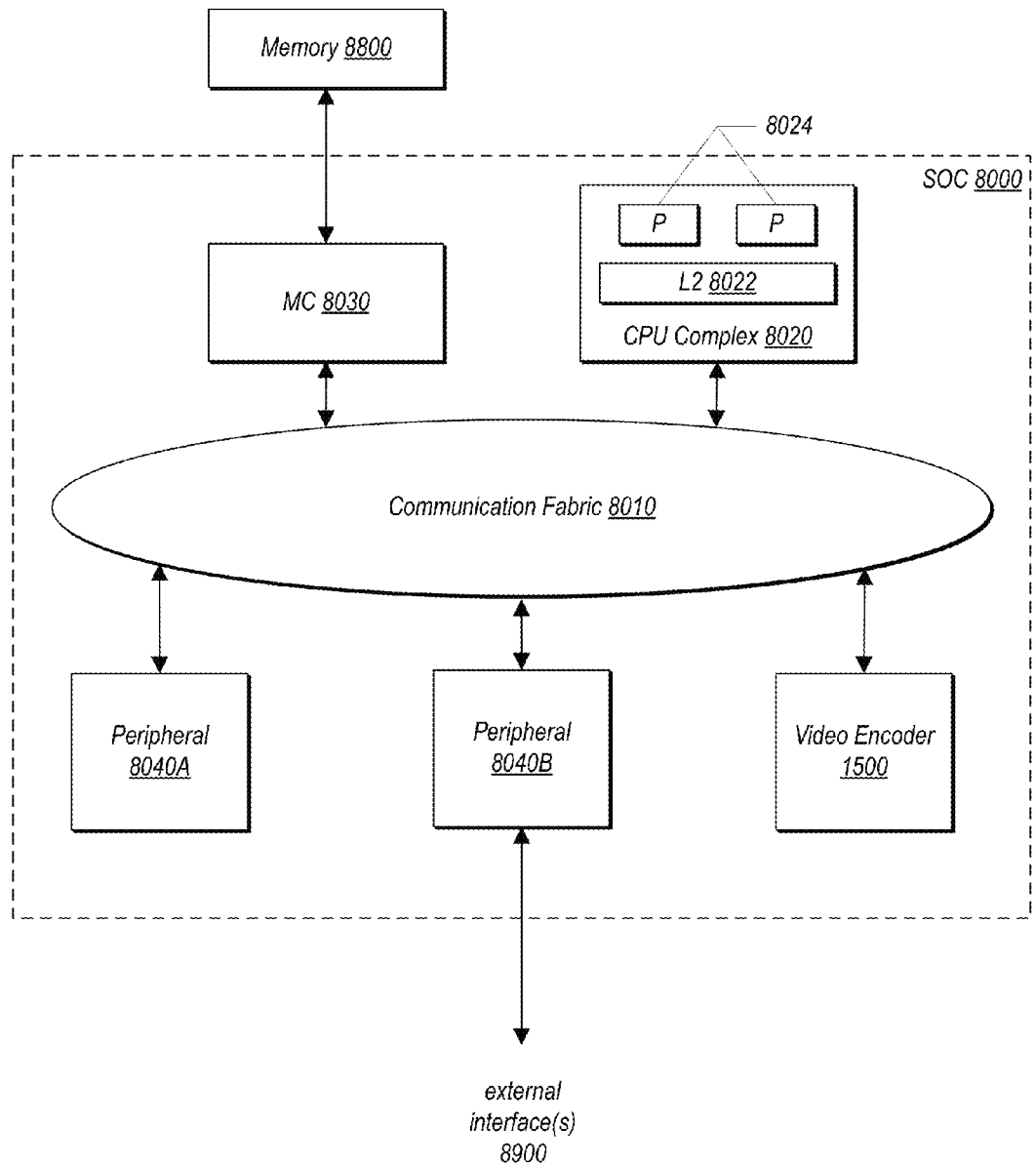
FIG. 16 is a block diagram of one embodiment of a system on a chip (SOC).

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 14, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 15. An example SOC that includes a video encoder apparatus is illustrated in FIG. 16. While embodiments are generally described in relation to hardware implementations of a block processing pipeline that implements the block processing method 1400 with knight's order processing, note that the block processing method 1400 with knight's order processing may be implemented by a block processing pipeline implemented in software.

A pipeline that implements the method 1400 as shown in FIG. 14 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1400 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1400 as shown in FIG. 14 that may be performed in stages by a pipeline, as well as general data flow through the pipeline, are briefly described below. Each of the general operations of the method 1400 may be implemented by one or more pipeline units at one or more stages of the pipeline. Example pipeline units are illustrated in FIGS. 13A through 13C. Also note that each general operation shown in FIG. 14 may be subdivided into two or more operations that may be implemented by pipeline units at one, two, or more stages of the pipeline. However, two or more of the operations shown in FIG. 14 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 14 and described below.

Macroblock Input

In at least some embodiments, macroblock input 1402 may be performed by an initial stage of the pipeline. In at least some embodiments, macroblock input 1402 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1410 operations. In at least some embodiments, an input buffer of up to 16 macroblocks is maintained for input pixels and statistics. The macroblock pixel data and corresponding statistics may be input to downstream stages of the pipeline according to a knight's order input algorithm as previously described in relation to FIGS. 3 through 8B.

In at least some embodiments, macroblock input 1402 reads neighbor data from the bottom row of a previous quadrow from memory at quadrow boundaries (see, e.g., FIGS. 10D, 11, and 12) and passes the neighbor data to at least one downstream stage.

Intra-Frame and Inter-Frame Estimation

Intra-frame and inter-frame estimation 1410 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1410 operations may be subdivided into two or more sub-operations that may be performed at one, two, or more stages of the pipeline, with one or more components or pipeline units at each stage configured to perform a particular sub-operation.

In at least some embodiments, macroblock input 1402 reads neighbor data from the bottom row of a previous quadrow from memory at quadrow boundaries and passes the neighbor data to intra-frame and inter-frame estimation 1410, for example to an intra-frame estimation component. In addition, motion compensation and reconstruction 1430, for example a luma reconstruction component, may pass neighbor data as feedback to intra-frame and inter-frame estimation 1410, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1420.

In at least some embodiments, motion estimation may also include a direct mode estimation component that receives co-located and spatial motion vector data and computes a direct/skip mode cost, which it provides to mode decision 1420. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1420.

In at least some embodiments, macroblock input 1402 reads neighbor data from the bottom row of a previous quadrow from memory at quadrow boundaries (see, e.g., FIGS. 10D, 11, and 12) and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1420 may be implemented by a mode decision component at a stage of the pipeline that is downstream of the stage(s) that implement intra-frame and inter-frame estimation 1410 operations. However, in some embodiments, mode decision 1420 operations may be subdivided into two or more sub-operations that may be performed at one, two, or more stages of the pipeline, with one or more components or pipeline units at each stage configured to perform a particular sub-operation. In at least some embodiments, the mode decision 1420 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 1420 component also performs all motion vector prediction. The motion vector prediction results may be used when estimating motion vector rate during mode decision. In at least some embodiments, the motion vector prediction results may also be fed back from the mode decision 1420 component to motion estimation, for example for use in direct mode estimation and motion vector rate estimation.

Motion Compensation and Reconstruction

In at least some embodiments, motion compensation and reconstruction 1430 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1430 may be subdivided into luma motion compensation and reconstruction and chroma motion compensation and reconstruction. In at least some embodiments, each of these sub-operations of motion compensation and reconstruction 1430 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1420. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1420, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1410 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 1420 results. The chroma motion compensation component performs subpixel interpolation to generate a prediction block. Mode decision 1420 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1410 so that reconstructed pixels can be used during the estimation process. In at least some embodiments, if the best mode is in intra, intra chroma estimation may be performed. based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries (see, e.g., FIGS. 10D, 11, and 12). For the top row of a next quadrow, macroblock input 1402 may then read this neighbor data from the memory at quadrow boundaries (see, e.g., FIGS. 10D, 11, and 12) and pass the neighbor data to at least one downstream stage of the pipeline.

Transcoder

In at least some embodiments, a transcoding operation may be performed by a transcoder 1450. The transcoder may be implemented as a functional component of the pipeline or as a functional component that is external to the pipeline. In at least some embodiments, the transcoder 1450 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1450 handles stitching the start and end of each row to generate a continuous stream at macroblock row boundaries. In at least some embodiments, the pipeline may embed metadata in the CAVLC output stream to facilitate stitching of the rows by the transcoder 1450.

Example Video Encoder Apparatus

FIG. 15 is a block diagram of an example video encoder apparatus 1500, according to at least some embodiments. The video encoder apparatus 1500 may, for example, be implemented as an integrated circuit (IC) or as a subsystem on an IC such as a system-on-a-chip (SOC). In at least some embodiments, the video encoder apparatus 1500 may include a pipeline 1540 component, a processor 1510 component (e.g., a low-power multicore processor), a memory management unit (MMU) 1520, DMA 1530, and an interconnect 1550 such as a bus subsystem or fabric that interconnects the functional components of the apparatus. The processor 1510 component of the video encoder apparatus 1500 may, for example, perform frame-level control of the pipeline 1540 such as rate control, perform pipeline 1540 configuration including configuration of individual pipeline units within the pipeline 1540, and interface with application software via a driver, for example for video encoder 1500 configuration. The MMU 1520 may serve as an interface to external memory, for example for streaming video input and/or output. Pipeline 1540 component may access memory through MMU 1520 via DMA 1530. In some embodiments, the video encoder apparatus 1500 may include other functional components or units not shown in FIG. 15, or fewer functional components than those shown in FIG. 15. An example block processing method that may be implemented by pipeline 1540 component is shown in FIG. 14. An example a system-on-a-chip (SOC) that may include at least one video encoder apparatus 1500 is illustrated in FIG. 16.

Example System on a Chip (SOC)

Turning now to FIG. 16, a block diagram of one embodiment of a system-on-a-chip (SOC) 8000 that may include at least one instance of a video encoder apparatus including a block processing pipeline that implements a knight's order processing method as illustrated in FIGS. 3 through 15. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 1500 (which may itself be considered a peripheral component), and a communication fabric 8010. The components 8020, 8030, 8040A-8040B, and 1500 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 16, SOC 8000 may include at least one instance of a video encoder 1500 component, for example a video encoder 1500 as illustrated in FIG. 15 that includes a block processing pipeline 1540 component that implements a block processing method 1400 as illustrated in FIG. 14. Video encoder 1500 may be an H.264 video encoder apparatus that may be configured to convert input video frames from an input format into H.264/Advanced Video Coding (AVC) format as described in the H.264/AVC standard. The block processing pipeline 1540 may implement a knight's order processing method as described herein in relation to FIGS. 3 through 14.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs.

The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 16, such as within the CPU complex 8020) may vary from embodiment to embodiment. There may be more or fewer of each component/subcomponent than the number shown in FIG. 16.

Example System

Figure 17:
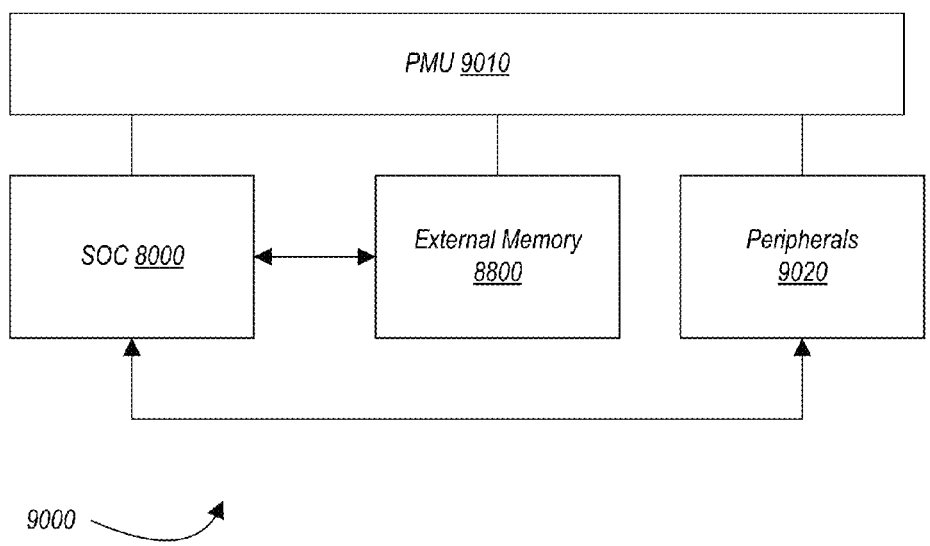
FIG. 17 is a block diagram of one embodiment of a system.

FIG. 17 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an interface to a memory; and
   a block processing pipeline comprising a plurality of stages, each stage configured to perform one or more operations on a block of pixels passing through the pipeline;
   wherein the apparatus is configured to process blocks of pixels from a frame in the block processing pipeline according to knight's order, wherein the frame is subdivided into rows and columns of blocks of pixels, wherein, to process the blocks according to knight's order, the apparatus is configured to:
      read the blocks of the frame from the memory via the interface;
      input a first block to the block processing pipeline;
      input one or more subsequent blocks to the block processing pipeline according to knight's order, wherein each subsequent block is located one row down and at least one column to the left of the location of a respective previously input block, and wherein at least two consecutive blocks input to the block processing pipeline are located one row down and a same number of columns to the left of the location of a respective previously input block; and
      write processed blocks output by the block processing pipeline to the memory via the interface;
   wherein processing the blocks in knight's order spaces the blocks in the block processing pipeline so that adjacent blocks on a row are not concurrently processed at adjacent stages of the block processing pipeline.

2. The apparatus as recited in claim 1, wherein the rows of blocks are separated into a plurality of row groups, each row group including two or more rows, and wherein, to process the blocks according to knight's order, the apparatus is further configured to constrain the knight's order input to the block processing pipeline on row group boundaries.

3. The apparatus as recited in claim 2, wherein each row group includes four rows of blocks.

4. The apparatus as recited in claim 2, wherein, to constrain the knight's order input to the block processing pipeline on row group boundaries, the apparatus is further configured to, after inputting a block on a bottom row of a row group to the block processing pipeline, input a next block from a top row of the row group to the block processing pipeline, wherein the next block from the top row is located at least two columns to the right of the location of the block on the bottom row of the row group.

5. The apparatus as recited in claim 2, wherein the row groups are processed end to end such that, after reaching the end of a row group, subsequent blocks are selected for input in knight's order from the beginning of a next row group.

6. The apparatus as recited in claim 2, wherein the apparatus is further configured to input invalid blocks at the left of a first row group to the block processing pipeline and input additional invalid blocks at the right of a last row group to the block processing pipeline, wherein inputting the invalid blocks to the block processing pipeline in knight's order maintains continuity of the knight's order input to the block processing pipeline, and wherein the invalid blocks pass through the stages of the block processing pipeline but are not processed at the stages.

7. The apparatus as recited in claim 6, wherein the first block input to the block processing pipeline is either the first block on the top row of the first row group or an invalid block to the left of the first block on the top row of the first row group.

8. The apparatus as recited in claim 1, wherein each subsequent block is located one row down and at least two columns to the left of the location of the previously input block so that diagonally adjacent blocks are not concurrently processed at adjacent stages of the block processing pipeline.

9. The apparatus as recited in claim 1, wherein the apparatus is a video encoder configured to convert video frames from a first video format to a second video format.

10. The apparatus as recited in claim 9, wherein the second video format is a compressed video format.

11. A method, comprising:
processing pixel blocks from an input frame in a block processing pipeline in knight's order, wherein the input frame is subdivided into rows and columns of pixel blocks, wherein the block processing pipeline includes a plurality of stages each configured to perform one or more operations on one of the pixel blocks of the input frame, and wherein said processing pixel blocks in knight's order comprises:
inputting a first pixel block to the block processing pipeline; and
inputting one or more subsequent pixel blocks to the block processing pipeline according to knight's order, wherein each subsequent pixel block is located one row down and at least one column to the left of the location of a respective previously input pixel block, and wherein at least two consecutive pixel blocks input to the block processing pipeline are located one row down and a same number of columns to the left of the location of a respective previously input pixel block;
wherein said processing the pixel blocks in knight's order spaces the pixel blocks in the block processing pipeline so that adjacent pixel blocks on a row are not concurrently processed at adjacent stages of the block processing pipeline.

12. The method as recited in claim 11, wherein the rows of pixel blocks are separated into a plurality of row groups, each row group including two or more rows, and wherein said processing the pixel blocks in knight's order further comprises constraining the knight's order input to the block processing pipeline on row group boundaries.

13. The method as recited in claim 12, wherein each row group includes four rows of pixel blocks, and wherein each subsequent pixel block is located one row down and at least two columns to the left of the location of the previously input pixel block so that diagonally adjacent pixel blocks are not concurrently processed at adjacent stages of the block processing pipeline.

14. The method as recited in claim 12, wherein said constraining comprises, after inputting a pixel block on a bottom row of a row group to the block processing pipeline, inputting a next pixel block from a top row of the row group to the block processing pipeline, wherein the next pixel block from the top row is located at least two columns to the right of the location of the pixel block on the bottom row of the row group.

15. The method as recited in claim 12, further comprising adding invalid blocks to the left of a first row group and adding additional invalid blocks to the right of a last row group, wherein the invalid blocks are input to the block processing pipeline in knight's order to maintain continuity of the knight's order input to the block processing pipeline, and wherein the invalid blocks pass through the stages of the block processing pipeline but are not processed at the stages.

16. A device, comprising:
a memory; and
an apparatus configured to process video frames and to store the processed video frames as frame data to the memory;
wherein each frame is subdivided into rows and columns of blocks of pixels, wherein the apparatus is configured to process the blocks of pixels from each frame in a block processing pipeline according to knight's order, and wherein, to process the blocks from a frame according to knight's order, the apparatus is configured to:
input a first block for the frame to the block processing pipeline; and
input one or more subsequent blocks for the frame to the block processing pipeline according to knight's order, wherein each subsequent block is located one row down and at least one column to the left of the location of a respective previously input block, and wherein at least two consecutive blocks input to the block processing pipeline are located one row down and a same number of columns to the left of the location of a respective previously input block;
wherein processing the blocks in knight's order spaces the blocks in the block processing pipeline so that adjacent blocks on a row are not concurrently processed at adjacent stages of the block processing pipeline.

17. The device as recited in claim 16, wherein the rows of blocks are separated into a plurality of row groups, each row group including two or more rows, and wherein, to process the blocks according to knight's order, the apparatus is further configured to constrain the knight's order input to the block processing pipeline on row group boundaries.

18. The device as recited in claim 17, wherein, to constrain the knight's order input to the block processing pipeline on row group boundaries, the apparatus is further configured to, after inputting a block on a bottom row of a row group to the block processing pipeline, input a next block from a top row of the row group to the block processing pipeline, wherein the next block from the top row is located at least two columns to the right of the location of the block on the bottom row of the row group.

19. The device as recited in claim 17, wherein the apparatus is further configured to input invalid blocks at the left of a first row group to the block processing pipeline and input additional invalid blocks at the right of a last row group to the block processing pipeline, wherein inputting the invalid blocks to the block processing pipeline in knight's order maintains continuity of the knight's order input to the block processing pipeline, and wherein the invalid blocks pass through the stages of the block processing pipeline but are not processed at the stages.

20. The device as recited in claim 16, wherein the device is a system-on-a-chip (SOC), and wherein the apparatus is a video encoder configured to convert the video frames from a first video format to a second video format.

* * * * *